(12) United States Patent
Gorelik et al.

(10) Patent No.: US 7,676,440 B2
(45) Date of Patent: Mar. 9, 2010

(54) NEUROMORPHIC MOTION CONTROLLER FOR CONTROLLING A JOINT USING WINNER TAKE ALL

(76) Inventors: Vladmir A. Gorelik, 7003 Sand Rd., Savannah, GA (US) 31410; Pavel V. Gorelik, 7003 Sand Rd., Savannah, GA (US) 31410

(*) Notice: Subject to any disclaimer, the term of this patent is extended or adjusted under 35 U.S.C. 154(b) by 820 days.

(21) Appl. No.: 11/578,020

(22) PCT Filed: Apr. 26, 2005

(86) PCT No.: PCT/US2005/014157

§ 371 (c)(1),
(2), (4) Date: Oct. 10, 2006

(87) PCT Pub. No.: WO2005/105390

PCT Pub. Date: Oct. 11, 2005

(65) Prior Publication Data

US 2007/0162404 A1  Jul. 12, 2007

(51) Int. Cl.
*G06N 3/02* (2006.01)
(52) U.S. Cl. .................................................. 706/15
(58) Field of Classification Search .................. None
See application file for complete search history.

(56) References Cited

U.S. PATENT DOCUMENTS

| | | | | |
|---|---|---|---|---|
| 4,884,216 A * | 11/1989 | Kuperstein | ............... | 700/259 |
| 4,932,806 A * | 6/1990 | Eklund et al. | ............... | 403/57 |
| 5,124,918 A * | 6/1992 | Beer et al. | ............... | 701/27 |
| 5,277,681 A * | 1/1994 | Holt | ............... | 482/112 |
| 5,634,087 A * | 5/1997 | Mammone et al. | ............... | 706/25 |
| 5,845,285 A * | 12/1998 | Klein | ............... | 707/101 |
| 6,514,219 B1 * | 2/2003 | Guimond et al. | ............... | 600/595 |
| 7,051,029 B1 * | 5/2006 | Fayyad et al. | ............... | 707/10 |
| 2006/0205570 A1* | 9/2006 | Jenkins | ............... | 482/91 |
| 2007/0255454 A1* | 11/2007 | Dariush | ............... | 700/245 |

OTHER PUBLICATIONS

Notification of Transmittal of the International Search Report and the Written Opinion of the International Searching Authority, or the Declaration. PCT/US2005/014157 Apr. 26, 2005.
Behavior Space of a Stretch Reflex Model and its Implications for the Neural Control of Voluntary Movement. C.F. Ramos, et al. Computing Jan. 28, 1990, No. 1, Stevenage, Herts., GB 15-23 XP000297215.

* cited by examiner

*Primary Examiner*—David R Vincent
*Assistant Examiner*—Ola Olude-Afolabi
(74) *Attorney, Agent, or Firm*—Cesari and McKenna, LLP

(57) ABSTRACT

An intrinsically stable neuromorphic motion controller comprising of two an agonistic actuators coupled with paired torque and position sensors. Each mechanical linkage having at least one degree of freedom is actuated by two motors via two flexible tendons with built-in stretch (torque) sensors.

23 Claims, 21 Drawing Sheets

NEUROMORPHIC MOTION CONTROLLER FOR CONTROLLING A JOINT USING WINNER TAKE ALL

BACKGROUND OF THE INVENTION

1. Field of the Invention

The present invention relates generally to positioning systems for controlling a dexterous motion of a robot's mechanical degrees of freedom.

2. Background Information

Commercially significant robotic applications evolved from the need to load metalworking Computer Numerically Controlled (CNC) machinery in production environments. The first industrial robots were used for welding, machine loading and tool positioning applications and were adapted to work in well-defined environments where they were required to perform repetitive jobs with a high degree of precision and throughput. Similar CNC approaches are currently used in most advanced robots. All of these robots act according to preprogrammed algorithms and perform reasonably well in well-defined environments. However, CNC approaches, when applied to robots acting in poorly defined real world environments, face many obstacles in achieving cooperative behavior of multiple robots or autopilots for vehicles. It is also problematic to maintain precise positioning and cooperative motion of multiple degrees of mechanical freedom of a single robot, especially as mechanical components age and experience wear.

Most robots utilize one actuator (motor) per single degree of mechanical freedom. Additionally, each degree of mechanical freedom requires at least one high-precision position sensor and, in some cases, a torque monitoring device. Such a torque-monitoring device typically derives its output from the value of a current supplied to the motor's winding, and is thus an indirect sensing mechanism. There are usually no preferred points in the set (if controlled by a stepper motor) or continuum (if controlled by a direct current (DC) motor) of permitted trajectories and, as a result, such systems are plagued by stability problems, which are usually addressed by implementing sophisticated control algorithms. These traditional approaches allow precise and rapid positioning along the pre-calculated trajectory of motion. However, speed, accuracy and stability of motion can be achieved only if all of the components of the motion system behave as specified in accordance with a transfer function defined during the system's programming and subsequent calibration. Additionally, a sophisticated controller is required to perform the motion, which typically increases the cost of such systems. Furthermore, the traditional single-degree-of-freedom control algorithms do not have provisions for integration into systems with multiple degrees of freedom when coherent control of motion of multiple joints of a robot's hand, leg, etc. is desired. The complexity of the controller depends on desired functionality—it can be as simple as digital ON/OFF switch and position limiters or as complex as digital signal processing (DSP)-based solutions with complicated acceleration/deceleration, positioning and contouring algorithms.

For example, a traditional motion-control subsystem becomes prohibitively expensive for any commercial use in a bipedal robot application as, in one form or another, it requires solving, in real time multiple "inverted-pendulum" problems with undefined boundary conditions in real. The problem becomes even more complex when a motion control algorithm is required to account for destabilizing effects associated with movements of adjacent degrees of freedom and/or changes to the robot's center of gravity. It would require taking into account multiple external factors such as the destabilizing effects of rugged terrain and the presence of other moving and/or stationary objects.

Therefore, there is a clear need for a method and device that will allow stable, reliable and inexpensive method for cooperative control of mechanical degrees of freedom of an autonomous robotic device.

SUMMARY OF THE INVENTION

The disadvantages of the prior art are overcome by the novel Neuromorphic Motion Controller (NMC) of the present invention. Illustratively, the NMC includes a mechanical linkage with a rotational or translational degree of freedom, at least two actuators and related drivers, two position sensors, two stretch (torque) receptors, and neuromorphic circuitry that provides one or more "zero attractors" to which a mechanical link converges in the absence of externally applied mechanical loads or external control signals. A single "zero attractor" is formed when positional sensors have monotonic transfer characteristics, whereas a plurality of "zero attractors" are created when positional sensors have non-monotonic transfer characteristics, thereby creating a mechanical "soft locking" region. However, in the illustrative embodiment, one global minimum exists for any degree of freedom.

External forces applied to a mechanical link typically produce a displacement from the "zero attractor," which, in turn, produces a compensatory response by the NMC controller to increase the torque applied to the corresponding tendon, which acts to return the mechanical link (joint) to the "zero attractor" point. When external control signals are applied to inputs of the neuromorphic circuitry, the "zero attractor's" position shifts to form an "offset attractor."

The NMC drives two antagonistic motors (e.g., motors that are in a push-pull or otherwise opposite relationship with each other) and receives inputs from two complementary position and force sensors. These components create a closed-loop mechanical positioning system that converges to an attractor defined by an input stimulus and the characteristics of two positional sensors. The NMC illustratively comprises at least two antagonistically acting channels, similar to an animal's flexor and extensor muscles, with each channel illustratively comprising two summing modules, one for forward and one for reverse motion, receiving inputs from weighted multipliers. For both the flexor and extensor channels, at least one weighted input of a forward sub-channel summing module is connected to the output of contralateral positional sensor and at least one input of another (reverse sub-channel) summing module is connected to the output of ipsilateral positional sensor. To protect motors and drivers and to limit the maximum and minimum torques developed by a mechanical degree of freedom, at least one weighted input of each sub-channel is connected to the thresholded output of the ipsilateral torque sensor. Other weighted inputs may be connected to external control modules or may be receiving corrective inputs from the adjacent degrees of freedom. The output of the summing module of each of two antagonistic sub-channels is connected via a low-pass filter to the non-inverting input of the corresponding motor driver. Similarly, each motor driver has one inverting weighted input that may be connected to the output of the contralateral motor driver to ensure "pull-follow-up" mode of operation in a fashion similar to the "winner-take-all" approach when one of antagonistic channels that receives the highest stimulus dominates the direction of motion of the actuator.

The NMC receives at least one signal proportional to the desired motion to be performed and may produce at least one output signal proportional to the current energy state of the controlled mechanical link. Therefore, the system can be forced away from the "zero attractor" point by stimuli produced by controllers associated with adjacent degrees of freedom and/or a central control unit. The further away the degree of freedom moves from the "zero attractor" the greater the energy of the corresponding state. The energy may have either positive or negative sign associated with it, which defines the direction of displacement from the "zero attractor" state.

BRIEF DESCRIPTION OF THE DRAWINGS

The above and further advantages of the present invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Neuromorphic Motion Controller

Figure 1:
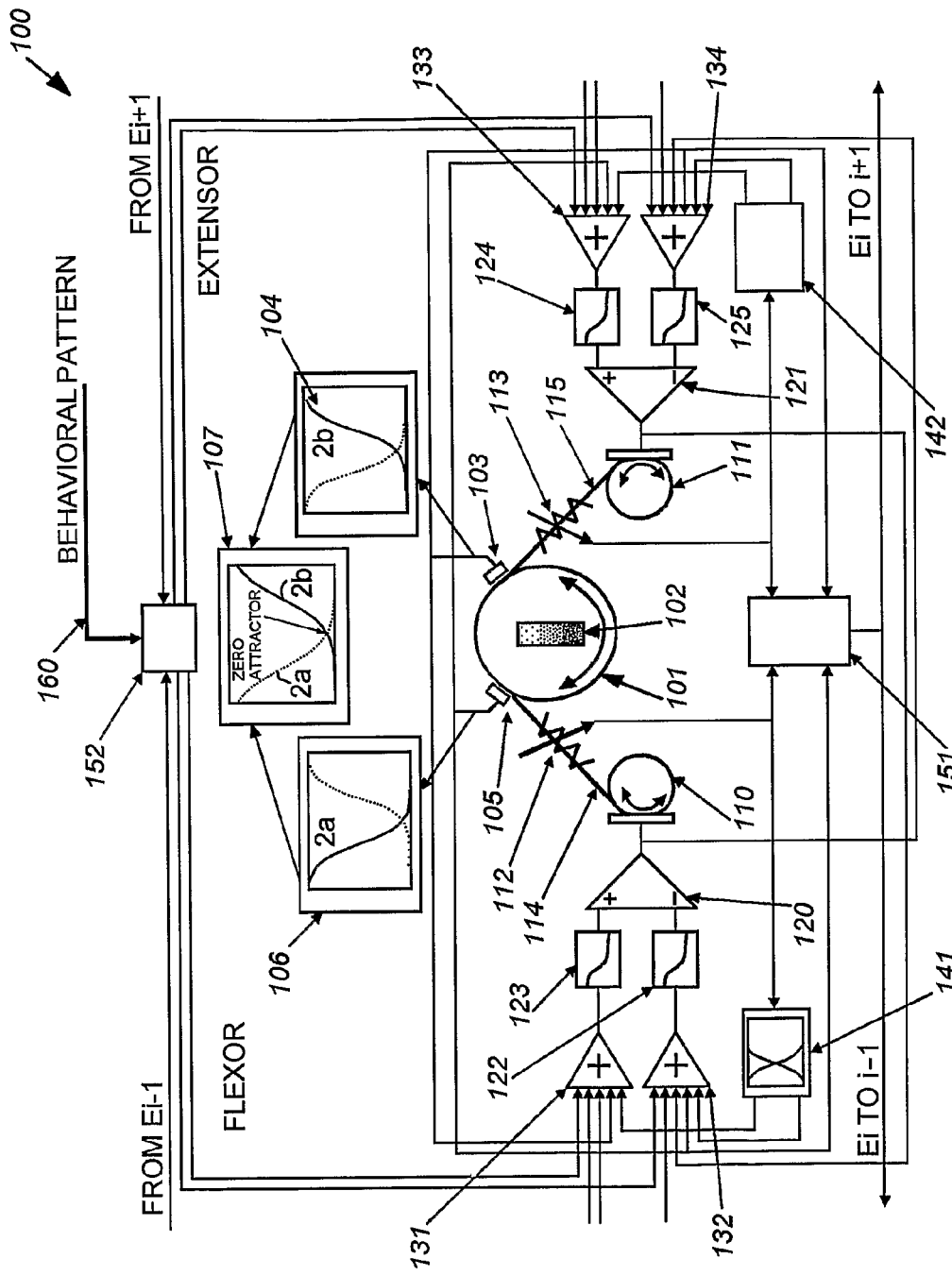
FIG. 1 is a schematic block diagram of a neuromorphic motion control in accordance with an embodiment of the present invention.

One aim of the present invention is to provide a method for positional control of a mechanical degree of freedom using at least two actuators, i.e., motors. A static attractor is associated with each degree of freedom, which coincides with a parking position at rest, where for a given mechanical load, the associated degree of freedom is at a minimum energy level while at this rest position. The parking position at rest is defined by its respective "zero attractor." By the nature of the attractor, when no external inputs are applied, a mechanical appendage associated with the corresponding degree of freedom is forced to the spatial coordinate point characterized by the lowest energy. In the case of a rotational degree of freedom, motors are connected to a pivot, or in the case of translational degree of freedom, to a linear slide, respectively. While one motor rotates the pivot or moves the slide in one direction, another, "antagonistic," that is arranged in an opposing direction, to the first motor, follows it in opposite direction, effectively forming a master/slave pair similar to a flexor/extensor muscle pair in animals.

Rotational or linear motors are connected to the mechanical link via a flexible cable, a chain or other suitable means. A stretch sensor is built into each cable (or alternatively into a joint or a motor mount) providing a response that is proportional to the force applied to the mechanical link and also introduces a limited degree of flexibility into the link to thus provide mechanical damping. At least two positional sensors are also coupled to each mechanical link or joint. Each positional sensor responds preferentially to a displacement in one direction from the parking position. Each sensor provides negative feedback with a particular gain coefficient to a corresponding master motor and positive feedback with another gain coefficient to the antagonistic slave motor actuator. When the link moves away from the parking position in the direction of the corresponding sensor, this sensor's output decays gradually. The second sensor's response characteristics are complementary to the first sensor's characteristics.

The first sensor's characteristics can be mirrored around the "zero attractor's" position in a non-distorted way if a symmetrical response is desired, or can be mirrored and distorted in a specific way if an asymmetrical response is desired. The sensors/controller/motors loop always attempts to balance in such way that the associated degree of freedom converges to an attractor to thereby minimize the sum of outputs of positional sensors. A definitive global minimum is formed at a point when output characteristics of two positional sensors intersect; and again, the location of the minimum is effectively the location of the "zero attractor." Positioning of a mechanical degree of freedom away from the attractor at rest is achieved by applying a properly scaled biasing signal to one (forward or reverse—depending on the direction of the motion desired) of the low-pass filters connected to the input of a motor driver. The signal, after being scaled to a smaller value, is also applied to the low-pass filters connected to the input of an antagonistic motor driver. This illustrative sequence of events moves the position of the attractor, which subsequently causes the appendage to follow.

FIG. 1 is a schematic block diagram of an exemplary intrinsically stable neuromorphic motion controller (NMC) 100 in accordance with an embodiment of the present invention. The NMC illustratively includes two motors 110 and 111 connected via tendons 114, 115, to a rotational joint (degree of freedom) 101. Each tendon 114, 115 includes a stretch sensor 112, 113. An inducer 102 is illustratively incorporated into a rotational joint 101. The inducer 102 may be of magnetic, optical, inductive or resistive nature. The inducer 102 is coupled to two angular positional transducers (sensors) 105, 103 illustratively without forming a direct mechanical contact; however, in some cases, e.g., resistive transduction, direct physical contact may be required. The present description is written in terms of Hall-effect based magnetic transduction for both positional and torque (stretch) sensing; however, as will be appreciated to one skilled in the art, inductive, capacitive, resistive or optical transduction may also be used without departing from the spirit or scope of present invention. Likewise the tendons may be substituted with any extensible members that allow sensed movement and corresponding rotation of the rotational joint in a manner generally consistent with the control parameters described herein. Illustratively, motor 110, tendon 114, stretch sensor 112, angular positional transducer 105 and related components form a "flexor channel." Similarly, motor 111, tendon 115, stretch sensor 113, angular positional transducer 103 and related components form an "extensor channel."

Joint 101 can move under the influence of the pulling force produced by motors 110, 111 in any arbitrary spatial orientation. The attached inducer 102 stimulates reciprocal responses in angular positional sensors 105 and 103. When, in the case of a rotational degree of freedom, the illustrative response characteristics 106, 104 of respective sensors 105, 103 are superimposed, they produce a combined response characteristic 107 of the NMC 100. Illustratively the response characteristics 106, 104 are in effect a sigmoid function. When joint 101 with inducer 102 moves toward the sensor, the sensor's output increases, whereas when inducer 102 moves away from the sensor, the sensor's output decreases. Therefore, when motion is dominated by the flexor channel, the output of transducer 105 increases and the output of transducer 103 decreases. Similarly, when motion is dominated by the extensor channel, the output of transducer 103 increases and the output of transducer 105 decreases. Such competing behavior creates a point of equilibrium where the outputs of both sensors 103, 105 are equalized. Such an equilibrium point is effectively the point of intersection of response characteristics 106, 104 on combined response characteristic 107 and is called an attractor. As can be appreciated by one skilled in the art, a translational degree of freedom can also be achieved using the above described technique without limiting the scope of present invention.

Motor amplifier 120, which is operatively interconnected to motor 110, illustratively includes differential inputs connected to two low-pass filters 122, 123 that receive connections from weighted summing nodes 131, 132 to form a flexor channel. Similarly, motor amplifier 121 is connected to motor 111 and includes differential inputs connected to two low-pass filters 124, 125 receiving connections from weighted summing nodes 133, 134 to form an extensor channel. Illustratively, motors 110, 111 can be electric, pneumatic or hydraulic motors or, more generally, any actuator that can produce a linear contraction proportional to the input signal, such as an electroactive polymer-based actuator.

Stretch sensors 112, 113 illustratively comprise one or more spring loaded Hall-effect based optical, inductive tenzoresistive, capacitive or resistive transducers that are built into tendons 114 and 115 are connected to weighted summing nodes 131, 132 and 133, 134 via function transformation modules 141 and 142 respectively. This circuitry comprises a force-feedback loop that warrants minimum tendon's load for a slave channel and appropriate, but not greater than maximum safe load for a master channel. Spring loading advantageously introduces flexibility and mechanical damping properties into the link.

The physical state of a degree of freedom is defined by its positional 105, 103 and the torque sensors 112, 113. Therefore, a function of these parameters defines the energy state of the joint. The specific energy of the joint may range from maximum positive value when the flexor's positional sensor 105 is at maximum, to a maximum negative value, when the extensor's positional sensor 103 is at maximum. Summing module 151 calculates the sum of the products of the outputs of the extensor and flexor positional and torque sensors according to the equation:

$$E = \omega_f^* \theta_f^* T_f - \omega_e^* \theta_e^* T_e. \quad (1)$$

where:
E is the energy characteristics of the joint in current state
$\omega_f$ and $\omega_e$ are the flexor and extensor weight multiplier coefficients, respectively;
$\theta_f$ and $\theta_e$ are the flexor and extensor positional sensor's output, respectively; and
$T_f$ and $T_e$ are the flexor and extensor torque sensor's output, respectively.

For each link (i) a value Ei is used to communicate the energy state of the link to adjacent links above (i+1) and below (i−1) in a mechanical system that contains multiple interconnected links. Module 152 receives as input energy state Ei from the NMC below (Ei−1) in the mechanical chain and from the NMC above (Ei+1) in the mechanical chain. Module 152 also receives a parameter 160 that defines a requested behavioral pattern to thereby produce four outputs to four weighted summing nodes 131, 132, 133, 134. Parameter 160 defines a specific behavioral property, for example, a temporal characteristic of desired pattern i.e. gate, or a degree of centrally controlled or autonomous behavior.

Flexor's summing nodes 131, 132 and extensor's summing nodes 133, 134 also receive inputs from positional and torque sensors and from external control modules. Outputs of both ipsilateral- and contralateral positional sensors are applied to both the flexor and extensor summing nodes, while preprocessed torque sensors outputs are applied only to the ipsilateral summing nodes.

The output of the extensor motor amplifier 121 is connected to another input of the contralateral summing node 132 engaged in the flexor's a reverse motion sub-channel, while the output of the flexor amplifier 120 is connected to another input of the contralateral summing node 134 engaged in the extensor's reverse motion sub-channel. Such mutual impediment creates a condition for "winner-takes-all" operation that ensures a "pull-follow-up" operation of the flexor-extensor channel.

In accordance with an illustrative embodiment of the present invention, the components and interconnects described herein produce an intrinsically stable behavior of the joint 102. The joint reliably drifts into a location defined by a mechanical attractor formed at intersection of response characteristics 106 and 104. If the joint 102 is intermittently forced out of this location and the external force is then removed the joint 102 will return to the attractor position without applying any precalculated stimulus. Additionally, introduction of torque loops allow such return even if the displacing force is constantly applied to the joint for as long as it does not exceed the maximum allowed torque. If no force is applied to the joint, the loop establishes the minimum required force in both flexor and extensor tendons.

Figure 2A:
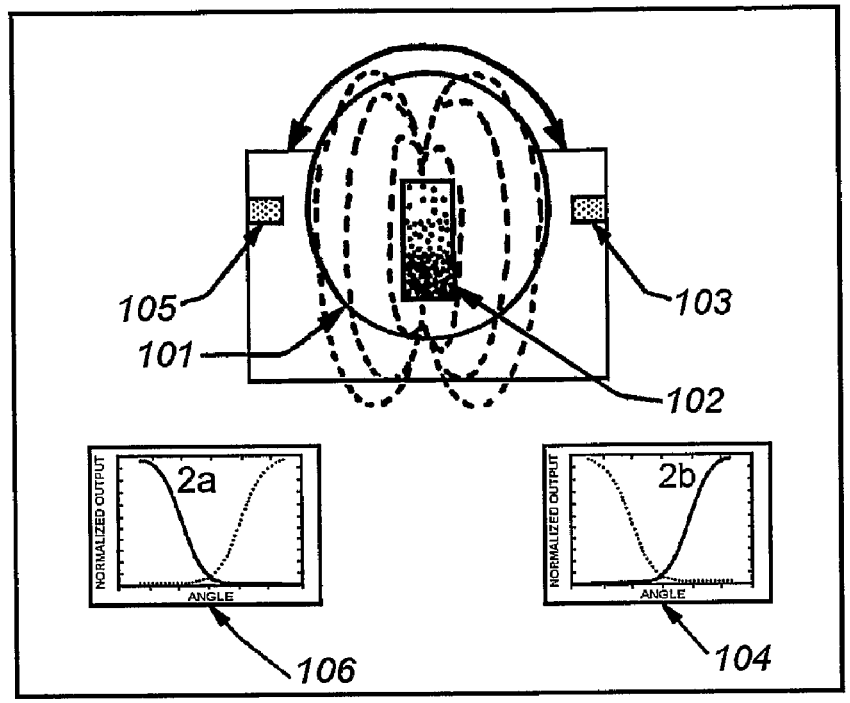
FIG. 2A is a schematic diagram illustrating a method for forming a sigmoid response characteristic in accordance with an embodiment of the present invention.
Figure 2B:
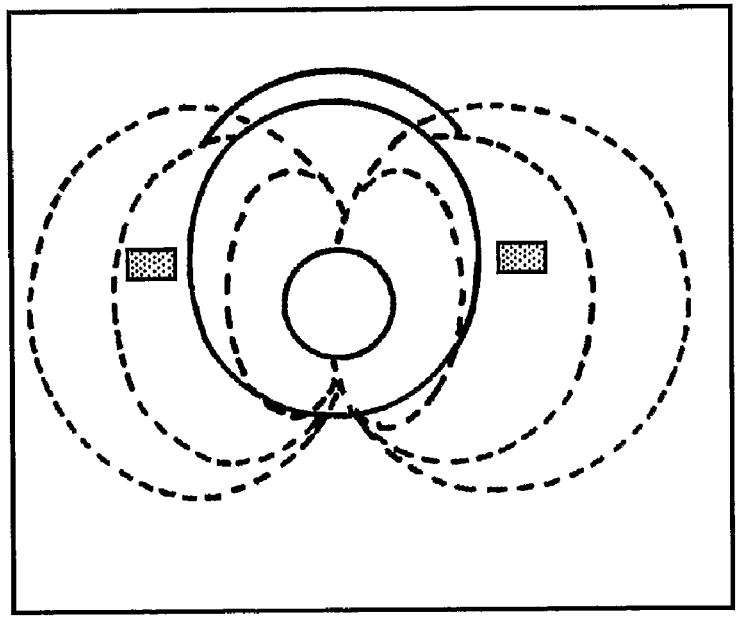
FIG. 2B is a schematic diagram illustrating a method for forming a sigmoid response characteristic of a different shape in accordance with an embodiment of the present invention.

FIGS. 2A, 2B are schematic diagrams illustrating a method for forming the sigmoid response characteristics 106, 104 of sensors 105, 103 as a function of angular displacement of a joint 101 with a built-in inducer 102. In the illustrative embodiment, the inducer is a cylindrical or spherical permanent magnet and sensors 105, 103 are Hall effect sensors or any other device capable of measuring the magnetic flux. Sensors 105, 103 are disposed in the vicinity of a joint 101 at strategic locations in such way that when at a maximum positive displacement of joint 101, the sensor 105 produces the maximum output while sensor 103 produces a minimum output. When joint 101 moves into the opposite direction to a maximum negative displacement, sensor 103 produces the maximum output while sensor 105 produces a minimum output. At the rest position that is characterized by an attractor spatial location, both sensors 105, 103 produce identical output values balancing the forces applied to the joint 101 produced by the controller 100.

FIG. 2A shows a cylindrical inducer 102 and it respective magnetic flux, while FIG. 2B shows a spherical inducer. As can be appreciated by one skilled in the art, by modifying the shape of a magnet, properties of the medium or the locations of sensors, different response characteristics 106, 104 may be achieved to meet desired requirements. It should be noted that an inducer 102 can be designed to be a ferromagnetic or diamagnetic material and sensors 105, 103 as magnetic coils forming variable inductors. Many other physical properties may be exploited without limiting the scope of the present invention, for example a capacitive, resistive or optical positional sensors with desired characteristics may be created by disposing a conductive, resistive or reflective coating across the surface of joint 101. Additionally, it should be noted that translational as well as rotational degrees of freedom can be implemented within the scope of current invention. The techniques for implementing such additional degrees of freedom rely generally upon the same principles of magnetic, inductive, resistive, optical, etc. transduction when the output of the sensor (transducer) depends on variation of the inducer's effect on the transducer's output as the inducer moves together with a translational degree of freedom along the direction of linear motion. For example, if two antagonistic positional transducers are disposed in-line with translational motion of a degree of freedom, output signal of one transducer will increase when the degree of freedom moves towards it, while output of the antagonistic transducer will decrease at the same time. Likewise, the conditions will reverse when the direction of motion changes.

Figure 3A:
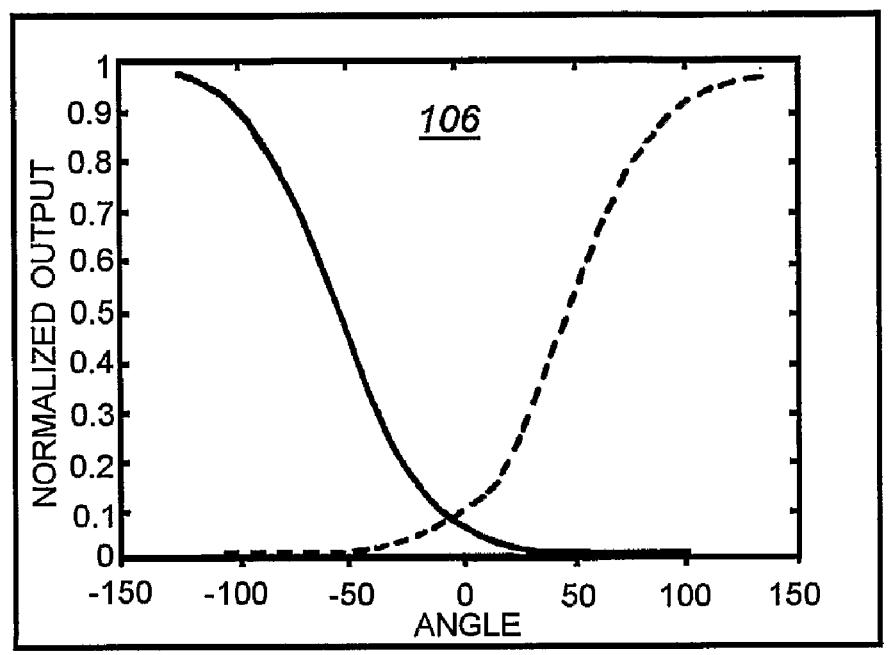
FIG. 3A is a schematic diagram of an illustrative sigmoid response characteristic in accordance with an embodiment of the present invention.
Figure 3B:
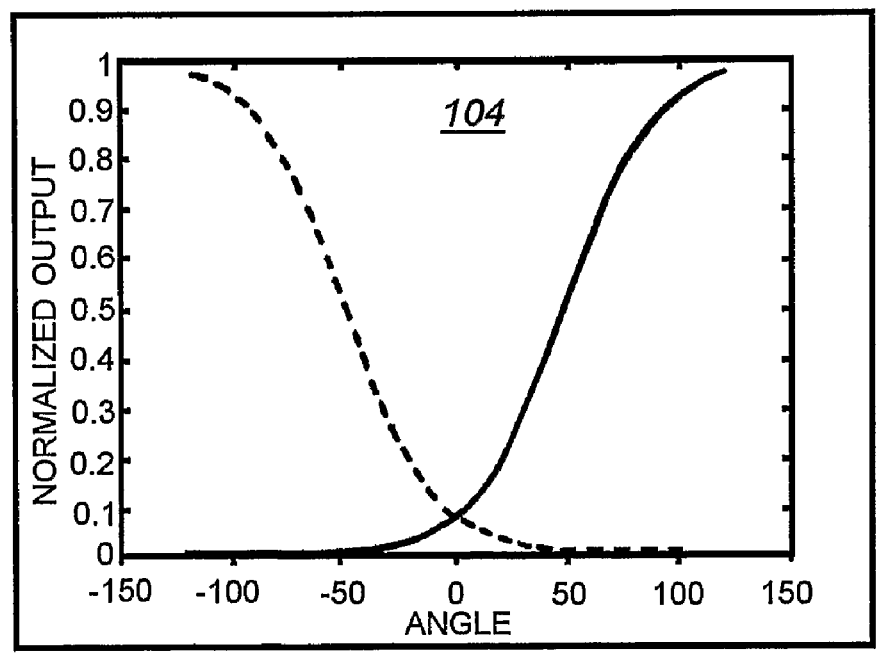
FIG. 3B is a schematic diagram of an illustrative sigmoid response characteristic in accordance with an embodiment of the present invention.

FIG. 3A is a graphical diagram of an illustrative sigmoidal transfer characteristic 106 of a sensor 105 as the inducer 102 moves from −150° to +150°. The output of the sensor is normalized and spans a continuum of values from 0-1. At the 0° point the output value is small, but still easily measurable. Similarly, FIG. 3B is a graphical diagram of an illustrative sigmoidal transfer characteristic 104 of sensor 103, which is a mirrored image of the sigmoidal transfer characteristics 106 of FIG. 3A. The properties of transfer characteristics 106, 104 are such that while the first becomes too small for reliable measurement, the second has the largest easily measured value.

B. Neuromorphic Motion Controller Use for Multiple Degrees of Freedom

Another aim of the present invention is to provide a device for positioning a mechanical link having two degrees of freedom, such as two rotational degrees of freedom used for an eye motion, in which case a ball-joint and four motors with at least four positional and four stretch sensors are illustratively used. Additionally, in an arrangement when a rod is connected to a ball-joint, a hip or a shoulder-type mechanical link is effectively achieved. In the case of a hip/shoulder arrangement, an extra rotational degree of freedom around the rod's axes extending from the center of rotation of a ball joint becomes possible by, for example, using two additional actuators with related position and stretch sensors to implement this extra degree of freedom.

Figure 4A:
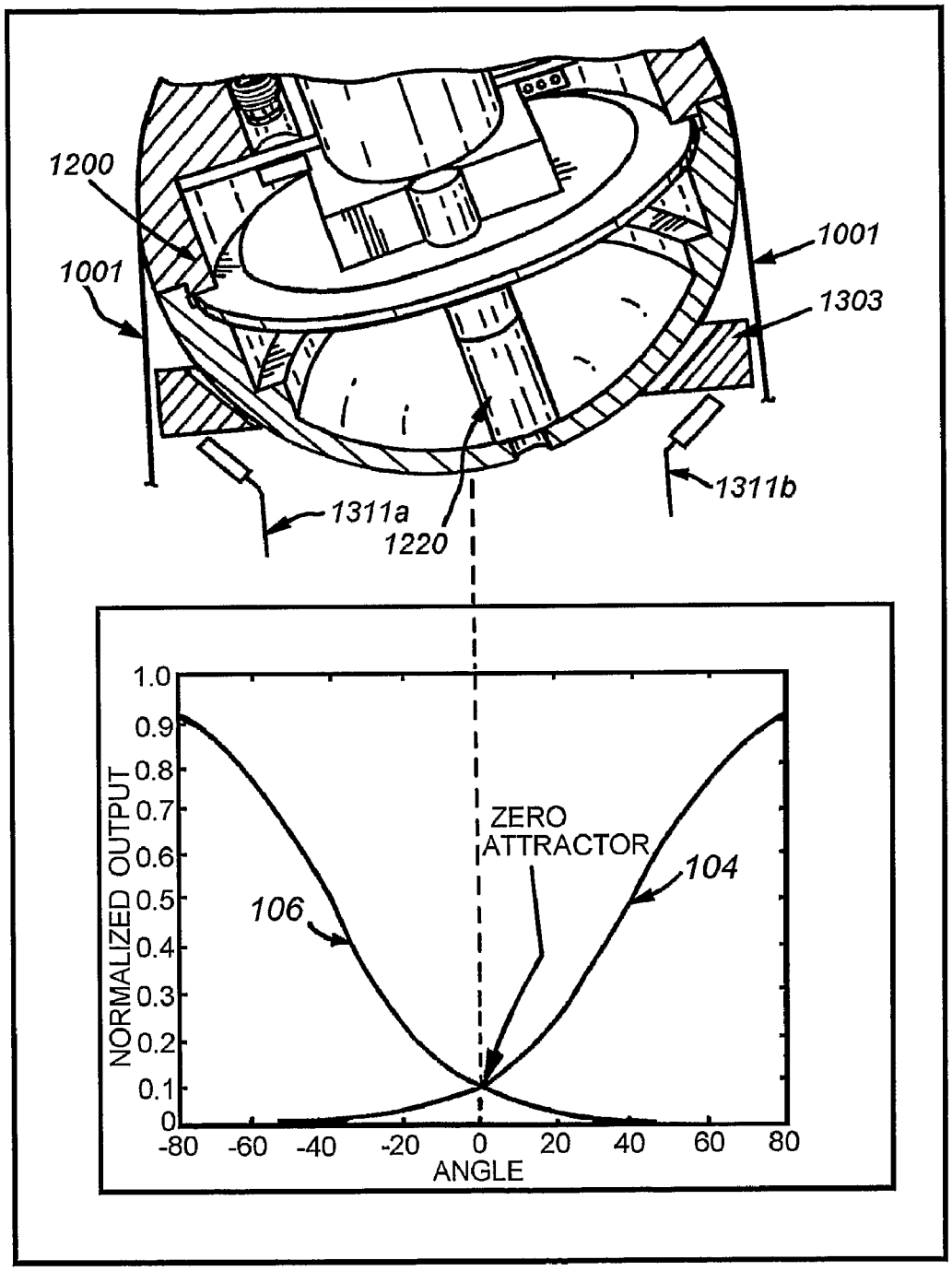
FIG. 4A is a perspective view and associated graph of a zero attractor of an illustrative spherical joint in accordance with an embodiment of the present invention.

FIG. 4A is a perspective diagram of an illustrative spherical joint (two rotational degrees of freedom) presenting, for example, a video camera assembly 1200. Under the influence of pulling from tendons 1001, the assembly can move freely with low friction in its bearing (sliding ring) 1303. A magnet 1220 is permanently attached, for example, inside of the assembly 1200. Four Hall effect sensors 1311*a,b* (only two are shown) are strategically disposed within the magnetic field of a magnet 1220. The transfer characteristic 104 corresponds to the output of right sensor 1311*b*, while transfer characteristic 106 corresponds to sensor 1311*a*. When the camera assembly 1200 moves counterclockwise, magnet 1220 approaches sensor 1311*b* and its output 104 increases, while output 106 of sensor 1311*a* decreases. Conversely, when camera assembly 1200 moves in the opposite direction, the signal behavior reverses. When camera assembly 1200 is in the middle position with magnet 1220 facing vertically down, transfer characteristics 106, 104 are equalized and camera assembly 1200 is in its zero attractor point.

Figure 4B:
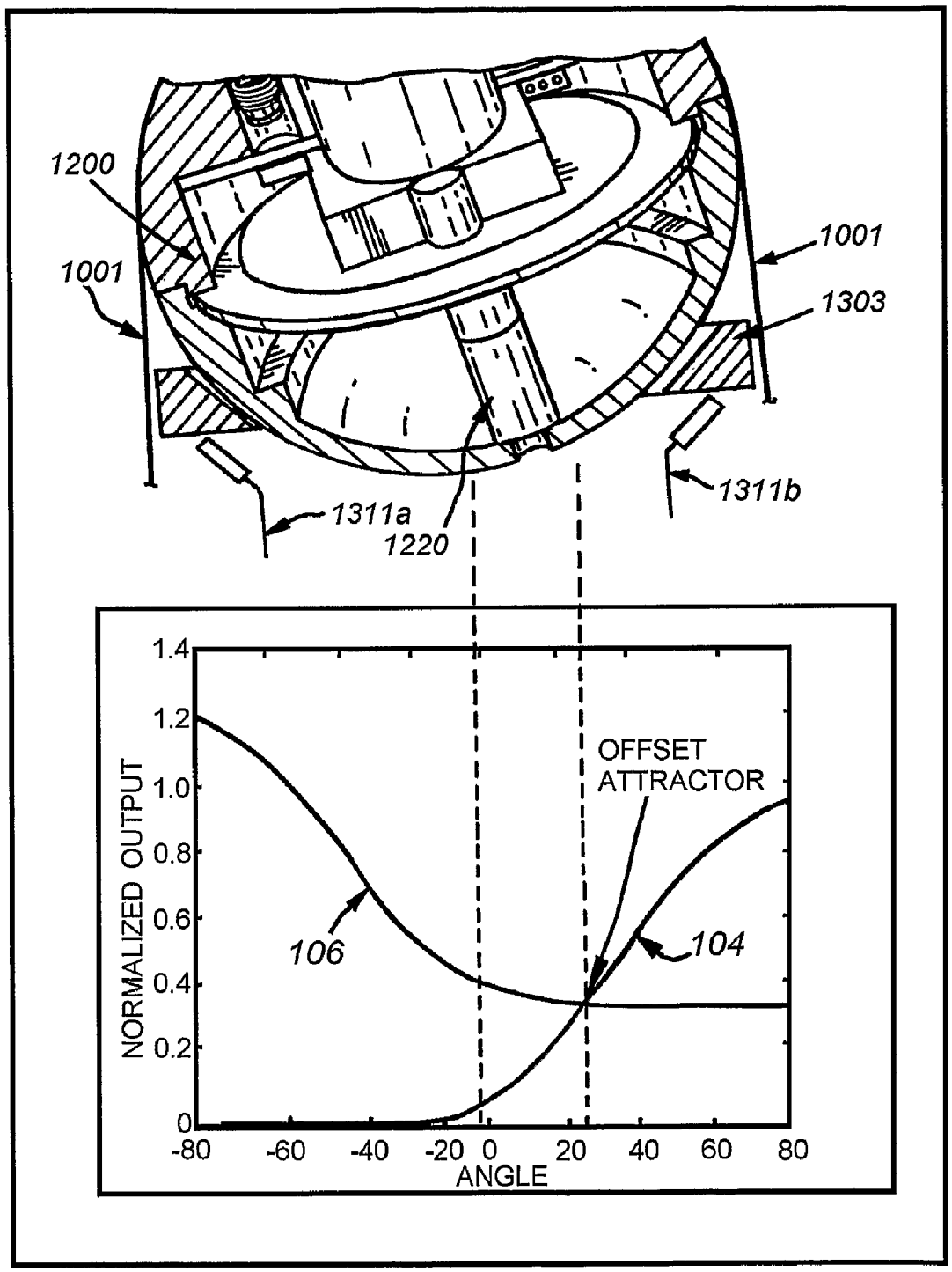
FIG. 4B is a perspective view and associated graph of an offset attractor of an illustrative spherical joint in accordance with an embodiment of the present invention.

FIG. 4B is a perspective diagram similar to FIG. 4A with the exception that transfer characteristic 106 has been biased up from its original state, thereby forcing the point of intersection of transfer characteristic 106 and transfer characteristic 104 to move up and left, thereby forming a new Offset Attractor.

Figure 4C:
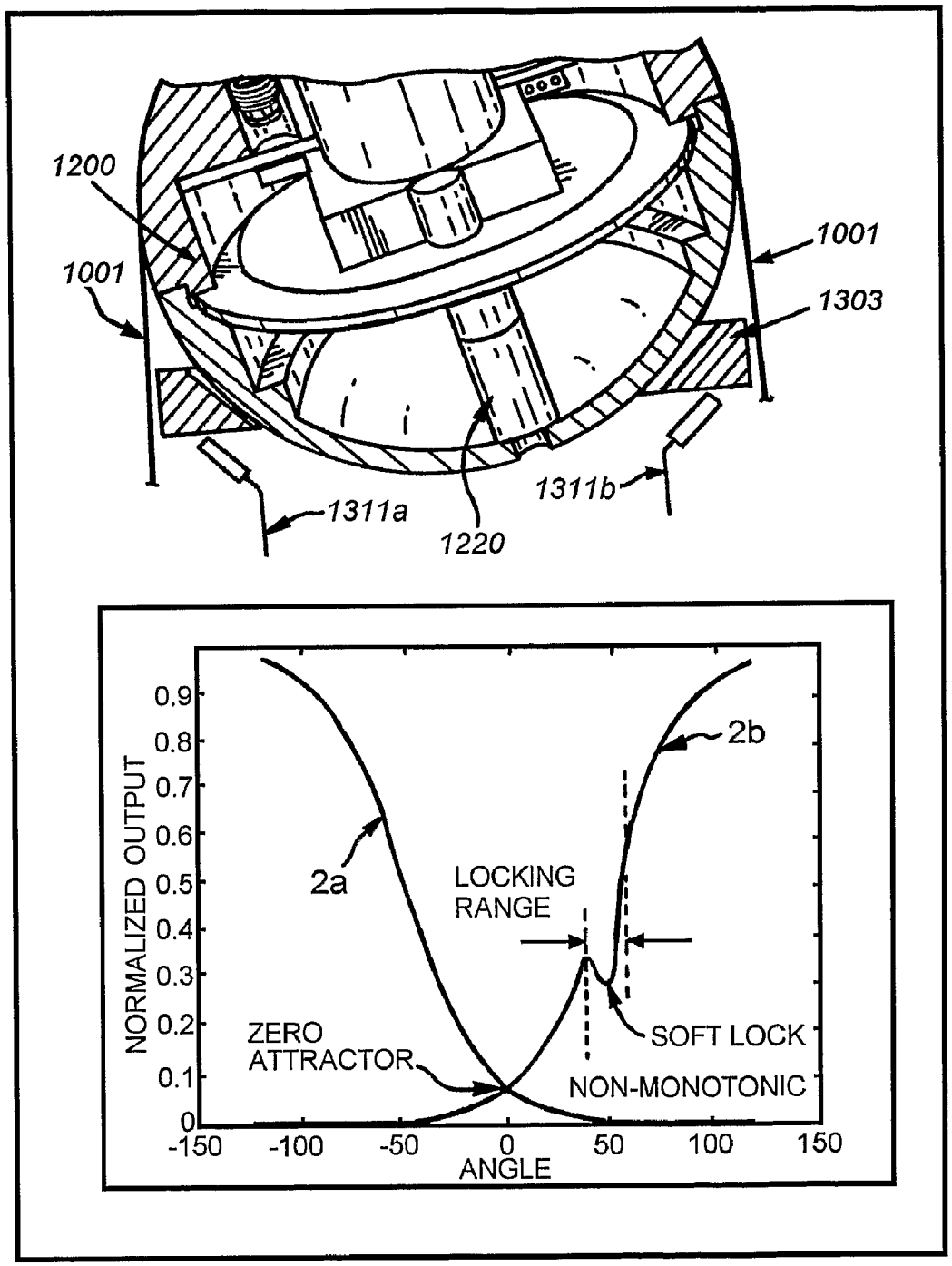
FIG. 4C is a perspective view and associated graph of an offset attractor of an illustrative spherical joint illustrating a soft lock point in accordance with an embodiment of the present invention.

FIG. 4C is a perspective diagram illustrating a soft-lock point being introduced into the motion behavior of a joint 101 or, in the particular case of a camera module 1200, by creating a "dip" in one or both transfer characteristics. When the Offset Attractor moves inside of the locking range, it enters the region of a local minimum of energy function. Thus, it will require an additional force to be applied to exit this region thereby effectively creating a point of soft locking of the appendage. Such a "dip" can be created by placing a magnet to distort the field or by changing the magnetic characteristics of the medium within the location of the desired "soft lock". It should be clear to one skilled in the art that such a "dip" can also be created by other techniques, for example, by nonlinear processing of the outputs of sensors 1311 or by utilizing an analog, digital or look-up table conversion methods. Likewise in alternate embodiments various hydraulic, pneumatic, mechanical and electromechanical assemblies can exert a predetermined force at a desired point to hold position with relatively low force.

Figure 5:
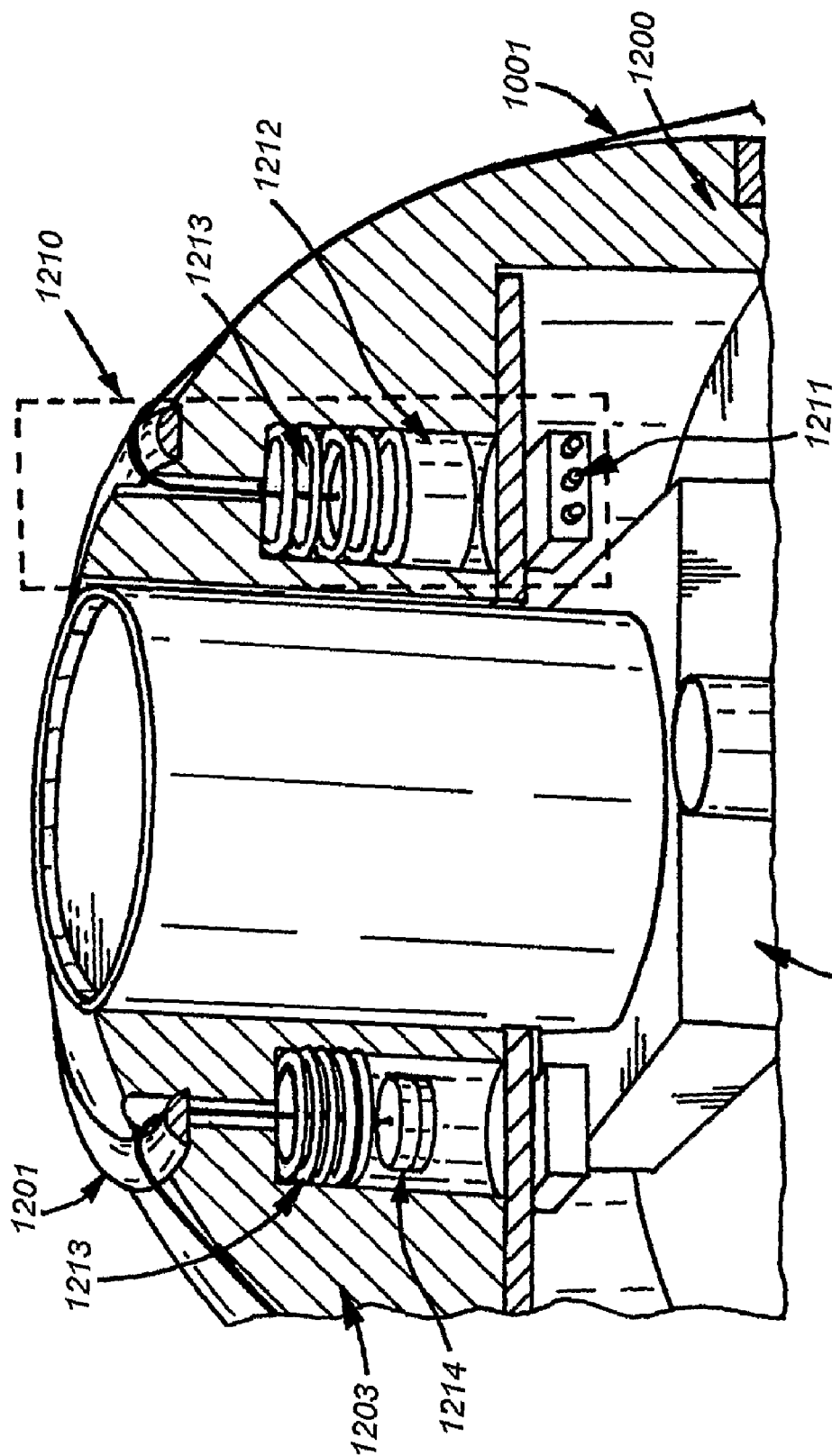
FIG. 5 is a cutaway perspective view of an illustrative in-line torque sensor assembly in accordance with an embodiment of the present invention.

FIG. 5 is a schematic diagram of an illustrative in-line torque sensor assembly 1210 built into tendon 1001 that may be implemented in an illustrative embodiment of a camera device. When implemented in spherical camera module 1200, the tendons 1001 are designed to slide with low friction over the material of camera's top hemisphere 1203 and the tendon's thrust ring 1201. Tendon 1001 changes its direction from tangential over tendon's thrust ring 1201 and enters the torque sensor's assembly shaft. The torque sensor's assembly shaft comprises of two coaxial cylindrical cavities: the smaller cavity is a tendon's guide, while the larger cavity is occupied by magnet housing 1212 comprising magnet 1214 (*a, b*) and metered load spring 1213 (*a, b*). A torque (essentially a magnet flux) sensor 1211 is disposed within a magnetic field of magnet 1214. As a motor (not shown) pulls the tendon 1001, it compresses spring 1213, forcing the magnet housing 1212 with magnet 1214 away from magnetic flux sensor 1211, and thereby reducing the output signal from sensor 1211. The degree of compression of metered spring 1213(*a, b*) is proportional to the torque applied to the spherical camera module 1200 that forces it to rotate. Materials of tendon 1001, camera's top hemisphere 1203 and tendon's thrust ring 1201 are typically selected to minimize the static and dynamic friction. However, residual friction can be taken into account while calibrating an NMC.

Figure 6:
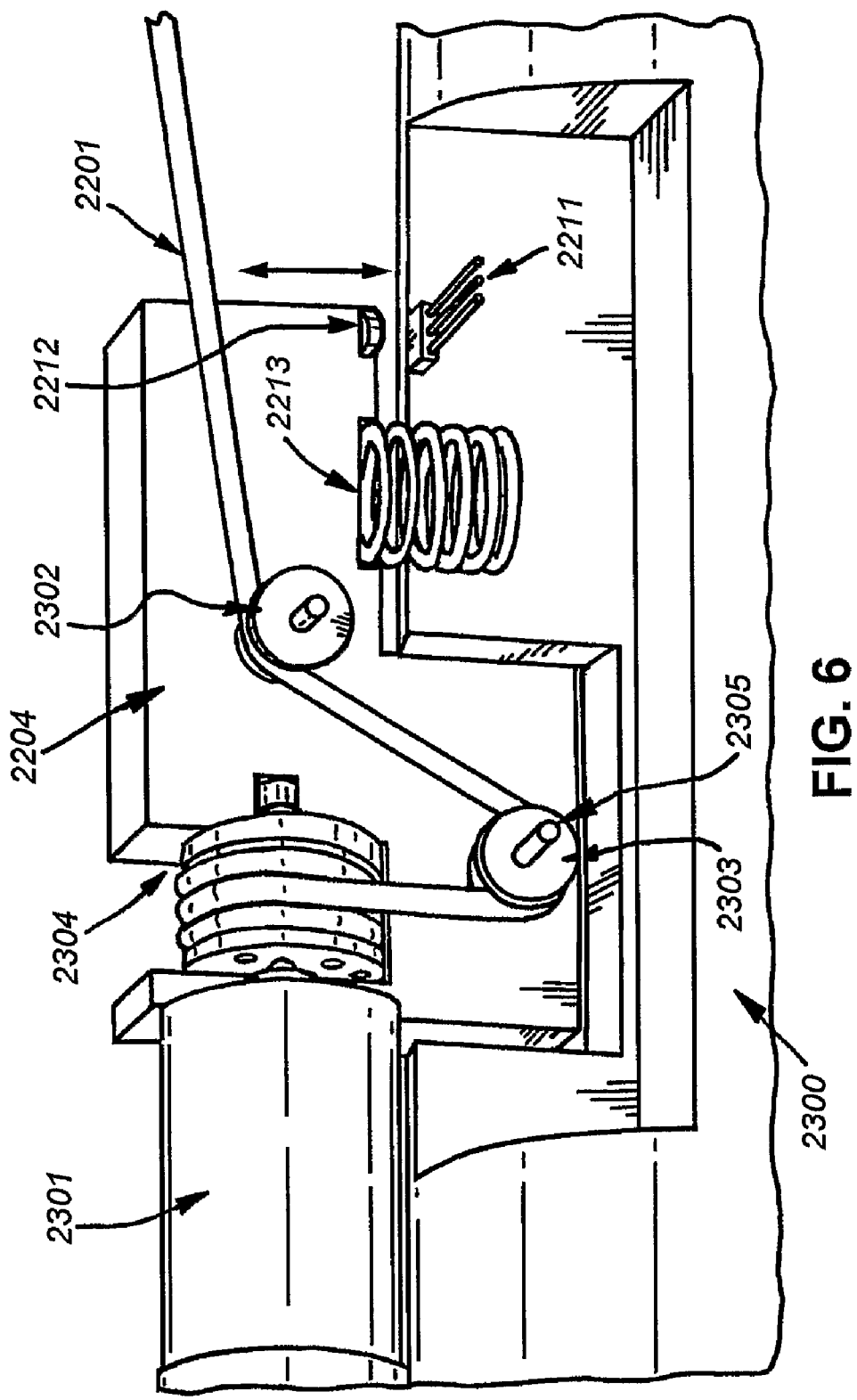
FIG. 6 is a perspective view of a motor and torque sensor assembly in accordance with an embodiment of the present invention.

FIG. 6 is a perspective diagram of a motor and torque sensor assembly illustratively designed for much higher torques than generally required to actuate a spherical camera module 1200. A motor 2301 with its pulley 2304 is mounted on a rocking arm 2204 having a freely rotated idler pulley 2302, an axle pulley 2303 and a magnet 2212. Rocker arm 2204 also includes a cavity to accommodate a tendon 2201 that is attached to a motor's pulley 2304, runs over an axle pulley 2303 and an idler pulley 2302 toward a joint to be actuated. An axle pulley 2303 is free to rotate around a rocker's arm axle 2305 that is fixed to a beam 2300 having cavities for housing rocker arm 2204, metered load spring 2213 and the illustrative Hall effect sensor 2211. A metered spring 2213 supports the rocker arm 2304 and compensates the component of a force applied to an actuated joint when motor 2301 and its pulley 2304 rotate and is created along the line connecting the axle of rotation of an idler pulley 2302 perpendicular to the imaginary line connecting the axle of the pulley 2303 and the point to which the other end of tendon 2201 is attached. The gap between magnet 2212 and sensor 2211 is a function of a force applied to the actuated joint, the geometry of the rocker arm 2204 components and the strength of the spring 2213.

While a Hall effect sensor is disclosed in a illustrative embodiment, it should be clear to one skilled in the art that within the scope of the present invention many other configurations are possible for measuring a dynamically changing gap between the rocker arm 2204 and beam 2300, including, but not limited, for example, inductive, capacitive, and optical methods, etc.

FIGS. 7A-D are perspective diagrams of one illustrative embodiment of the present invention, namely, a binocular active imaging system 1000 capable of rapid camera positioning similar to mammalian saccadic motion, while converging both cameras on an object of interest. As used herein, a binocular active imaging system 1000 will also be termed a "head assembly."

Figure 7A:
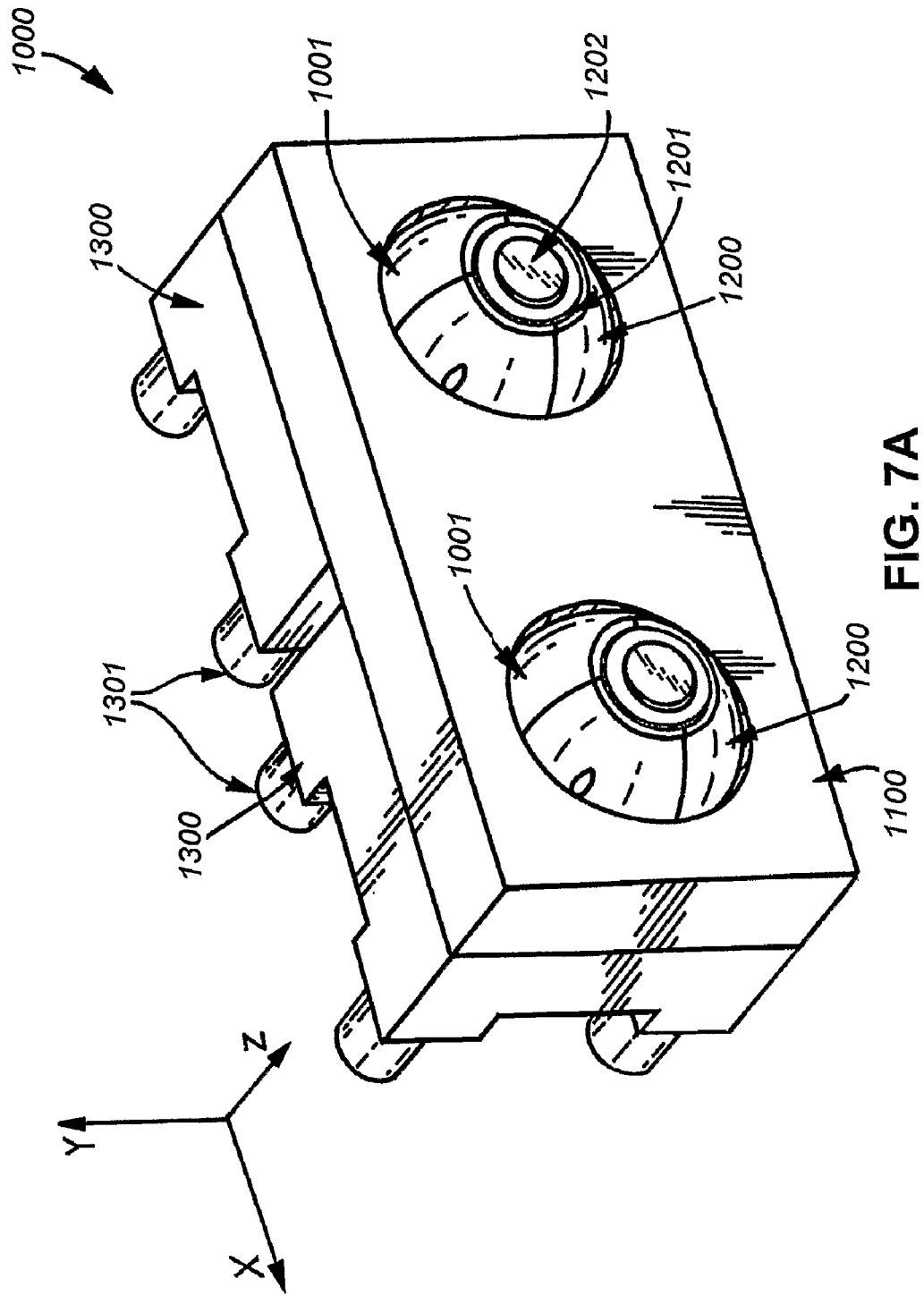
FIG. 7A is a perspective view of a binocular camera assembly in accordance with an embodiment of the present invention.

FIG. 7A is a perspective diagram of a binocular camera assembly 1000 in accordance with an embodiment of the present invention. The camera assembly 1000 comprises two spherical camera modules 1200 with cameras 1202, thrust rings 1201 and tendons 1001. Illustratively, the cameras 1202 are mounted in a front housing 1100 with motors 1301 mounted in two rear housings 1300.

Figure 7B:
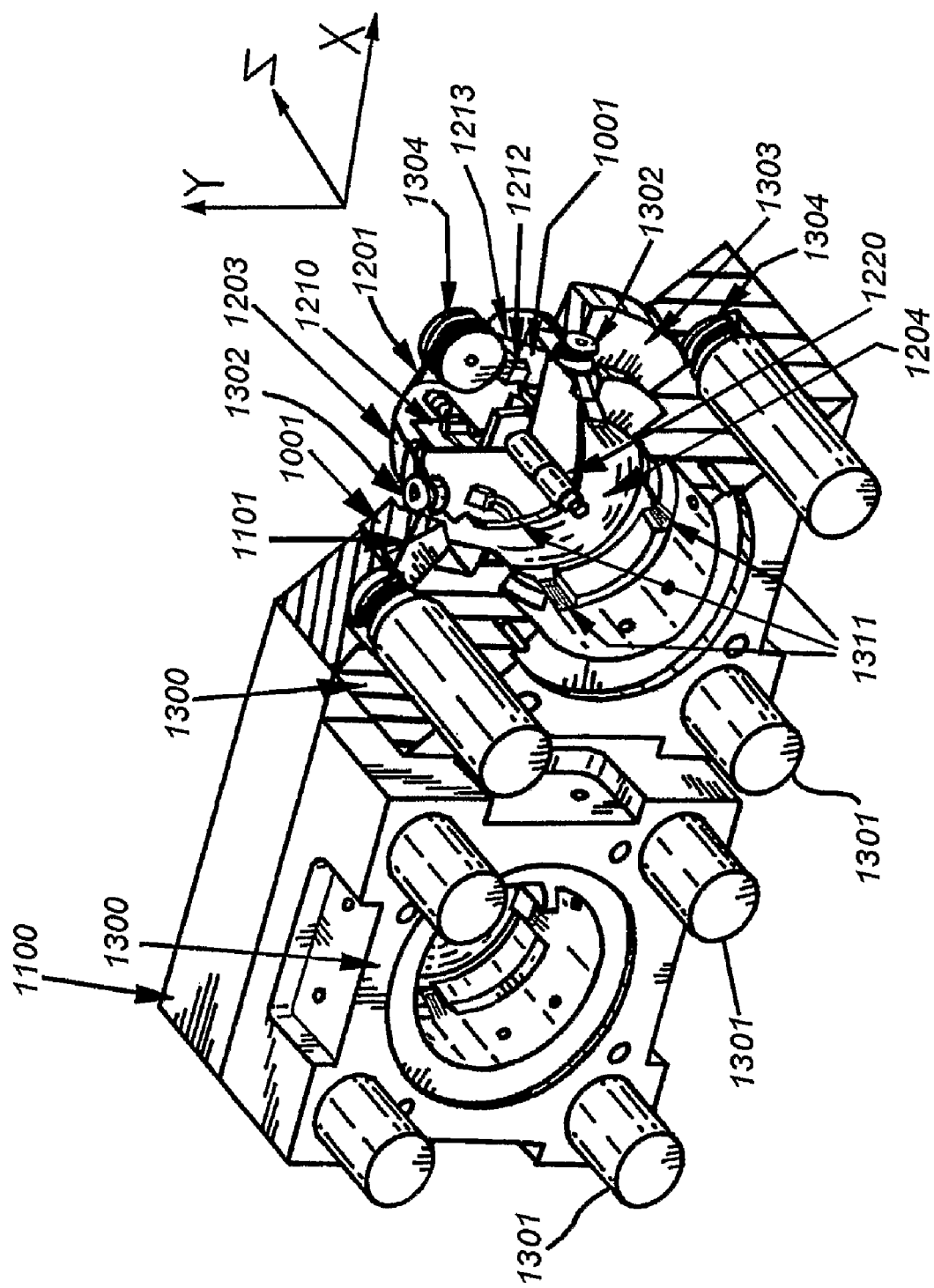
FIG. 7B is a cutaway perspective view of a binocular camera assembly of FIG. 7A in accordance with an embodiment of the present invention.

FIG. 7B is a perspective diagram of the rear spatial relationships between key components of a binocular camera with a quarter cutoff of one of spherical camera modules. Eight motors 1301 with motor pulleys 1304 are mounted in two rear assemblies 1300; tendons 1001 run from motor pulleys around idler pulleys 1302 through the guide rings 1101 around top hemispheres 1203 into torque sensors' assembly shafts. As the spherical camera modules 1200 rotate in their low-friction support rings 1303 around their geometric centers under the influence of pulling forces imposed by one or two tendons 1001, a magnet 1220 attached to the interior of the camera module 1200 also moves which results in a changing magnetic flux across all four positional sensors 1311 disposed around the camera module 1200.

Figure 7C:
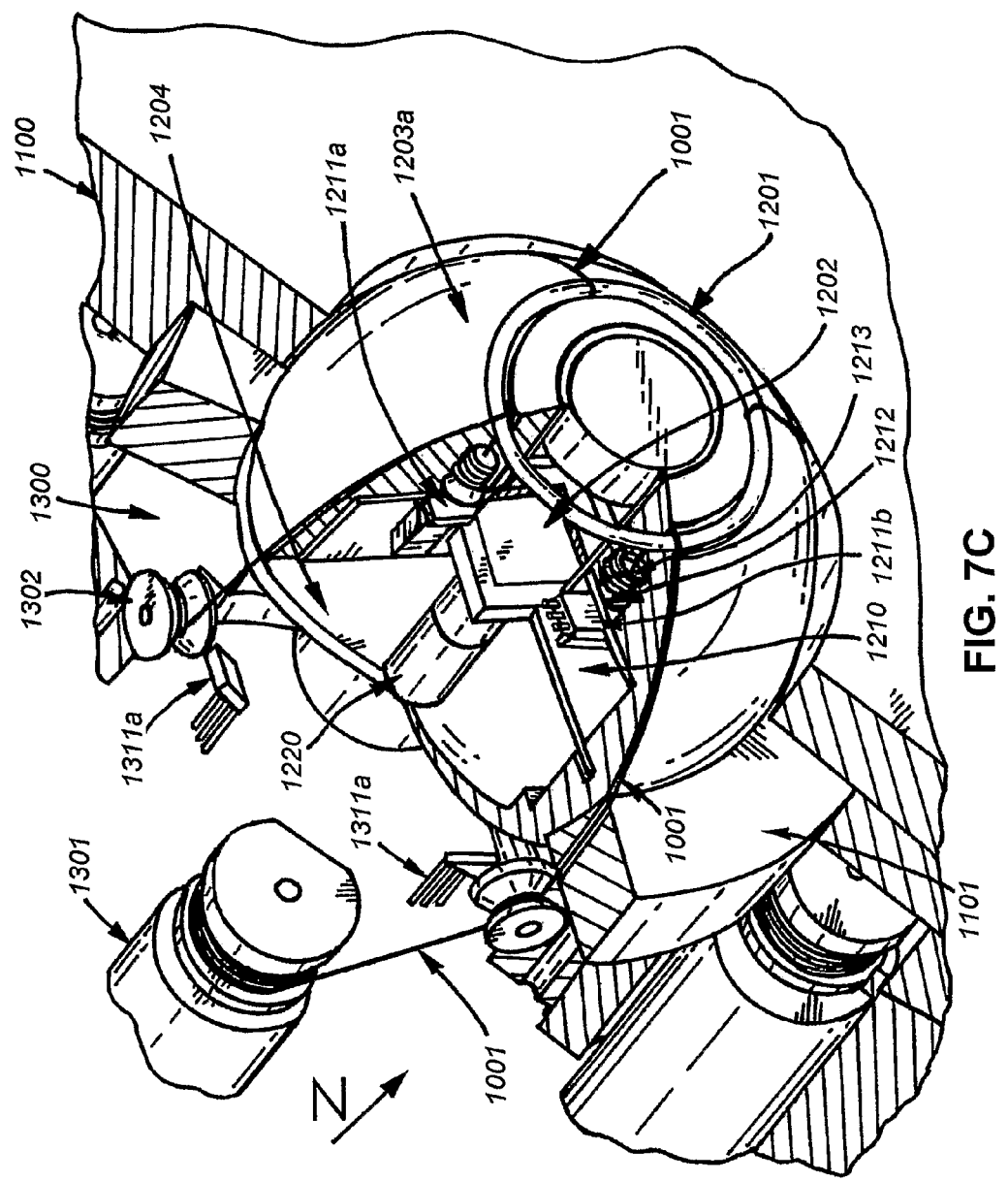
FIG. 7C is a cutaway perspective view of a binocular camera assembly in accordance with an embodiment of the present invention.
Figure 7D:
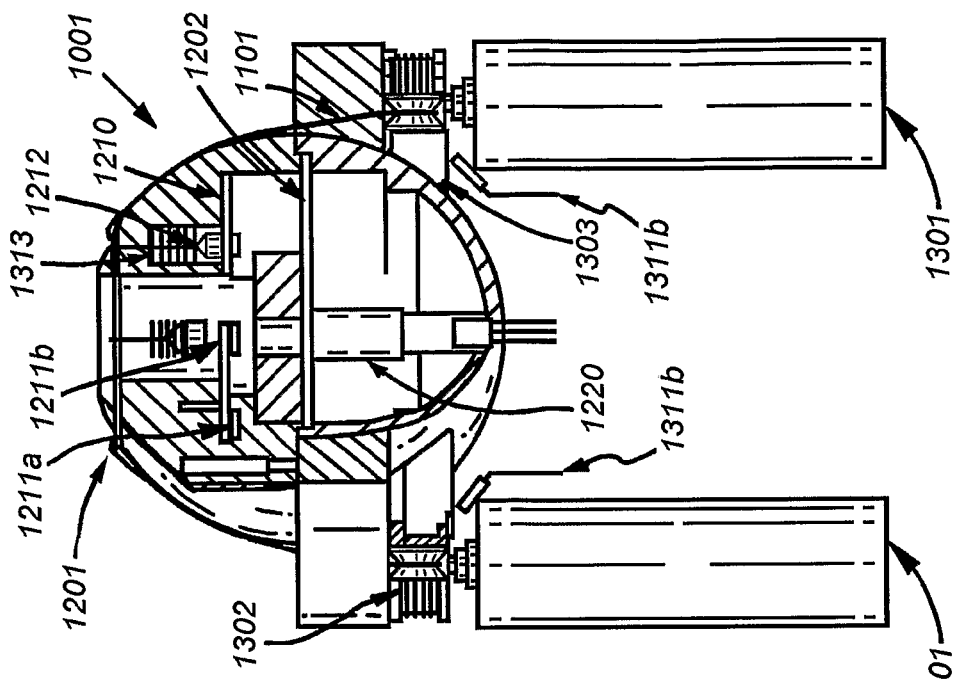
FIG. 7D is a partially exposed top view of a binocular camera assembly in accordance with an embodiment of the present invention.
Figure 7D:
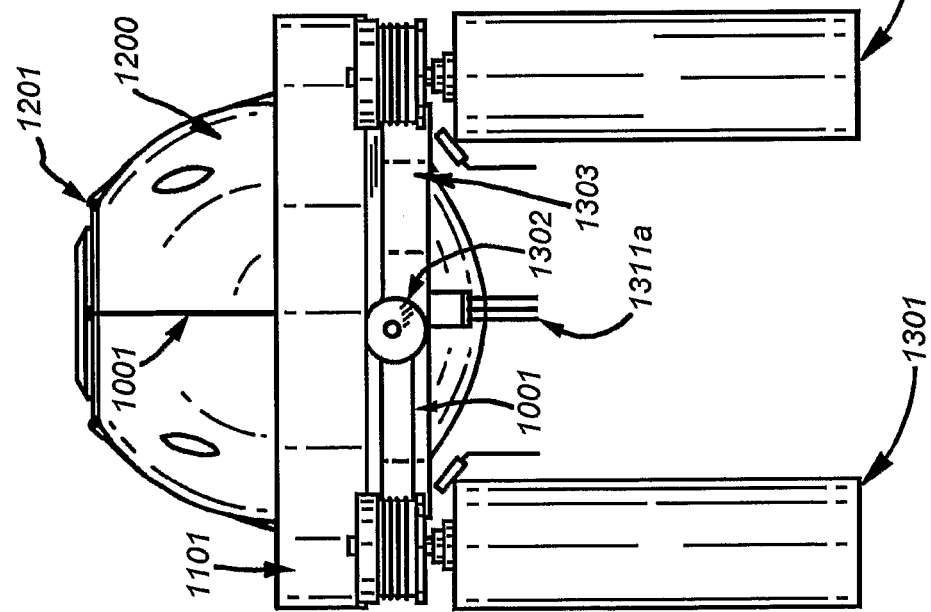

FIG. 7C is a perspective diagram of a front view of a binocular camera with a quarter cut off of one of the ball camera modules showing additional details of the spatial relationships between different components of a binocular camera. Particularly, the routes of pulleys 1001 are shown with more clarity as well as positions and orientations of sagittal 1211*a* torque and 1311*a* positional and horizontal 1211*b* torque and 1311*b* positional sensors FIG. 7D is a perspective diagram of a top view of a binocular camera with a quarter cut off of one of ball camera modules and with front housing 1100 and two rear housings 1300 removed for clarity. The location of sensors 1311a,b is shown in relation to camera module 1200.

Figure 8:
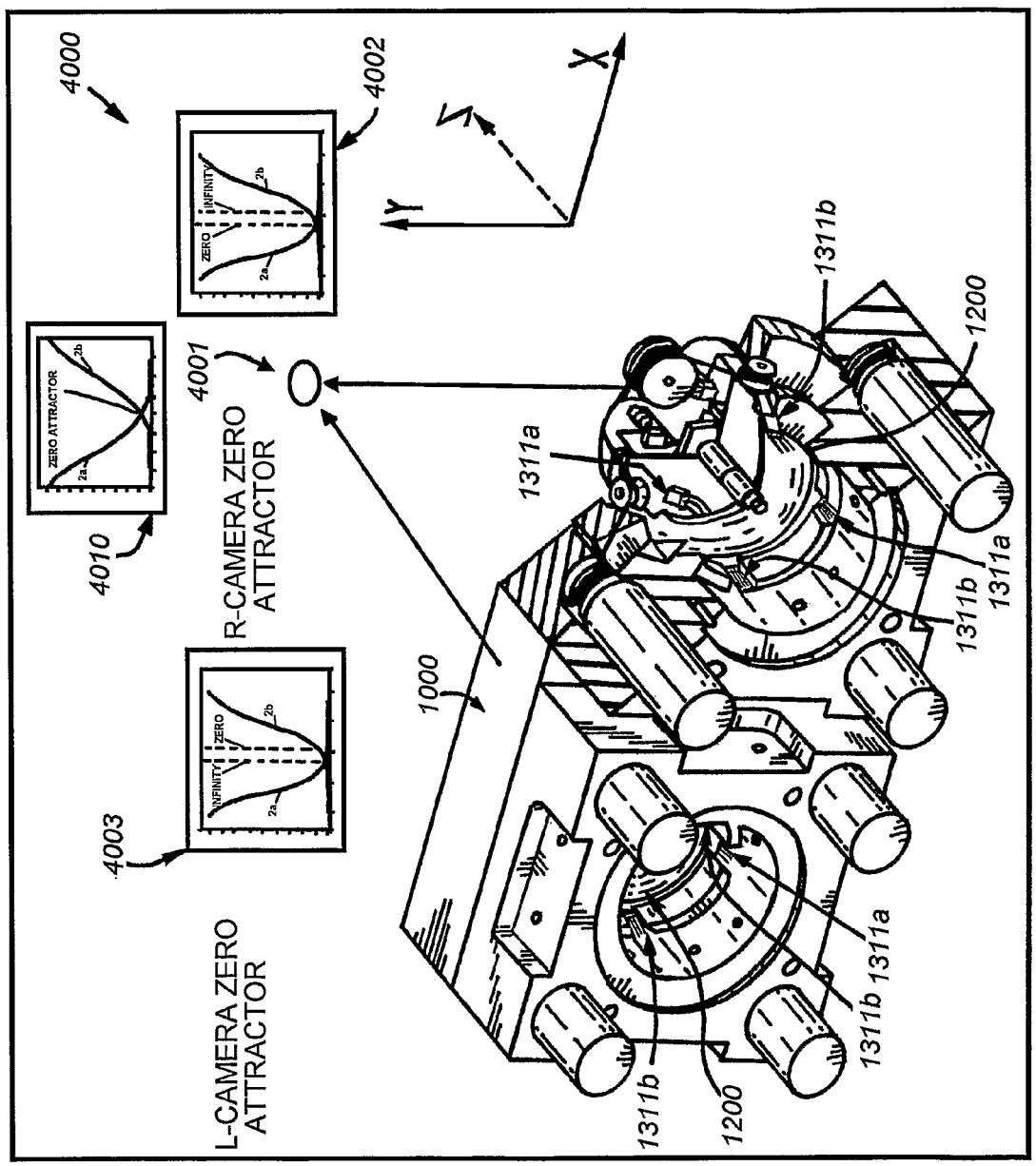
FIG. 8 is a cutaway perspective view of the binocular camera assembly and associated graphs of illustrating optical convergence of two camera modules in accordance with an embodiment of the present invention.

FIG. 8 is a perspective diagram illustrating the optical convergence of two camera modules 1200 of a binocular camera 1000 in accordance with an illustrative embodiment. Two attractors define angular orientation of each camera module 1200—one in the horizontal and one in the vertical planes. The illustrative mechanism utilizes biasing horizontal positional sensors 1311b of the left camera module 1200 slightly to the right and biasing horizontal positional sensors 1311b of the right camera module 1200 slightly to the left. This is accomplished in a manner similar to explained on FIG. 4B by adding a small positive bias to the right sensor 1311b of the right camera and to the left sensor 1311b of the left camera. The same effect may be accomplished by using negative bias applied to the opposite sensors of the same cameras or appropriately distorting the sensor's output characteristics using many approaches known to skilled in the art. As a result, the zero attractor graph 4002 of the right camera 1200 shifts to the left and the zero attractor graph 4003 of the left camera 1200 shifts to the right forcing optical axis' of the left and right cameras to intersect at point 4001 even in absence of any control stimulus' applied to corresponding NMCs.

Thus, point 4001 is essentially an Eye Zero Attractor. Such behavior allows introduction of a second-degree attractor 4010 defined again by two antagonistic components—angular position of the left camera module and angular position of the right camera module. However, unlike first-degree attractor described earlier, a second-degree attractor provides an opportunity for controlling two spatial dimensions—it allows defining a vector rather then a scalar. In other words a binocular camera module 1200, and for that matter, any device whose behavior is defined by a second-degree attractor, can be pointed to a specific location in space at a specified distance—vector in polar, cylindrical or spherical coordinate system.

C. Multiple Mechanical Appendages

Another aim of the present invention is to provide a method for controlling the cooperative motion of multiple mechanical appendages attached (linked) to each other, which, in effect, form an arm, a leg, or a spine. Each appendage may have one or more degrees of rotational and/or translational freedom. At least one NMC is associated with each degree of freedom of each mechanical appendage. For example, when an appendage has three degrees of freedom, as in the case of a shoulder, eye or hip, three corresponding NMCs form a single group responsible for the cooperative motion of the given appendage. When all appendages of an arm, leg, or spine are at rest or in a park position, which is considered as a "global rest position," the outermost appendage or an end-effector is also effectively at the rest position. While in the global rest position, a manipulator (arm, leg, spine, etc.) has a minimum energy level associated with it.

In a multi-link (multi-appendage) arrangement, a first NMC, or a first group of NMCs, is associated with the first appendage (an end-effector), and a second NMC (or group of NMCs) is associated with the second appendage to which the end-effector is linked. There are a finite number of NMCs (or groups thereof) linked together in both ascending/descending fashion, similar to the linking order of appendages in an arm, leg, or spine. The last controller (or group) and the associated appendage is effectively the base link connected to, for example, a body of a robotic device. The body of a robotic device can be mobile or able to change its position in the World's Coordinate System, or immobile. Similar to physical connections between appendages to form a manipulator with multiple degrees of freedom, the NMCs and/or their groups are also interconnected in an ascending and descending fashion, i.e.; the end-effector controller is connected to the second, the second is connected to the third, etc. At the bottom of the chain is the base controller.

Each NMC communicates its energy level associated with the related appendage to the NMCs immediately above and below it. The energy of the system increases when an end-effector is moved from the rest position and is forced to point to a new destination. This energy level is communicated to the subsequent controller above in the chain and forces it to produce a motion of the next appendage in the chain to minimize the energy level of the preceding appendage. The chain may contain an arbitrary number of appendages and it should be clear to anyone skilled in the art that any combination of rotational, translational or other types of joints can also be implemented using the disclosed method. Considering that all appendages are attached to the body, they operate in the Body Coordinate System. The mechanism described above minimizes the total energy of appendages involved in bringing the end effector to the point of destination. However to further reduce the energy of the system may require repositioning of the body in the World's Coordinate System. In case of a mobile robot this is equivalent to repositioning the robot's body to further reduce the total energy of an effector performing a locomotive action.

Figure 9:
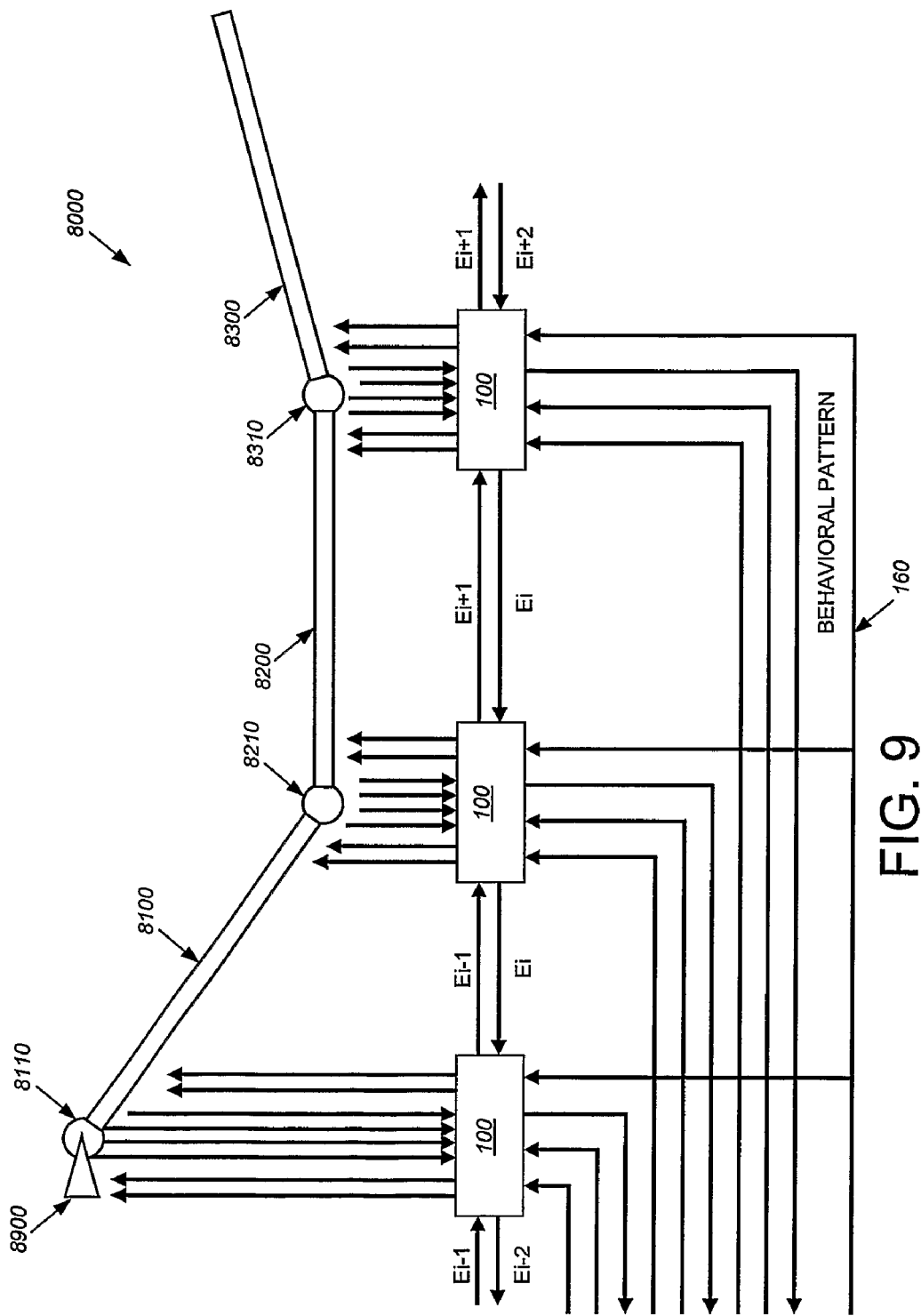
FIG. 9 is a side view of three-linked device having three degrees of rotational freedom in accordance with an embodiment of the present invention.

FIG. 9 is a diagram of a device 8000 (an arm or a leg) with three links and three degrees of rotational freedom. In the illustrative device 8000, the first link 8100 (shoulder) is connected to the body 8900 via a one dimensional (1D) rotational or two dimensional (2D) spherical joint 8110, the forearm 8200 is connected to the shoulder 8100 via rotational joint 8210 and the wrist 8300 is connected to the forearm 8200 via joint 8310. A single 1D NMC 100 actuates each 1D rotational joint, while two NMCs 100 actuate each 2D spherical joint. Energy Ei inputs and outputs of all NMCs 100 are connected in a daisy-chain fashion that replicates the order of connections of mechanical links in such a way that each NMC 100 in a chain "knows" the energy state of the preceding and following controller 100. Furthermore, the energy state of each NMC 100 in a daisy chain can directly influence the offset attractors of the adjacent controllers.

NMCs 100 receive two positional and two torque inputs from their respective joints and issue forward and reverse stimuli to flexor and extensor channels of the respective joint. Each controller 100 receives two individual stimuli from the external control module, a first stimulus defines the requested degree of flexing, while a second the degree of extending of the joint. An external controller issues a single signal 160 defining the preferred Behavior Pattern to all controllers 100.

Figure 10:
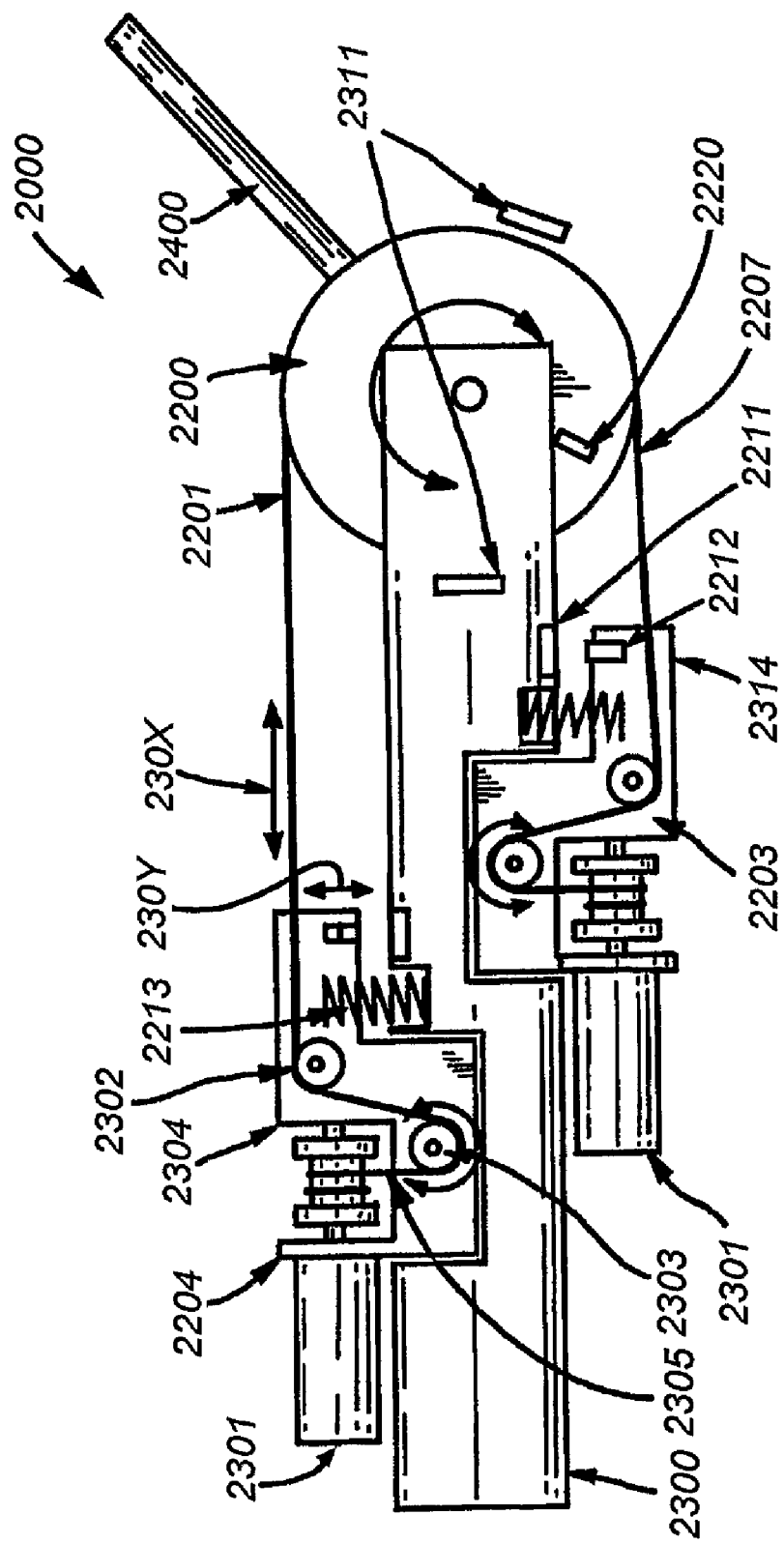
FIG. 10 is a perspective view of a one dimensional degree of freedom in accordance with an embodiment of the present invention.

FIG. 10 is a diagram of a 1D rotational degree of freedom (a joint) as described in the previous section. A joint 2200 connects links 2300, 2400. Link 2400 is directly attached to a joint's pulley, while an inducer's magnet 2220 is also mounted on the rotating joint 2200. Illustratively, angular positional sensors 2311 are disposed in such way that their outputs form an attractor. Joint 2200 is actuated by two tendons, namely flexor 2201 and extensor 2207 that are forced into motion by two rocking arm assemblies 2304 and 2314.

Figure 11:
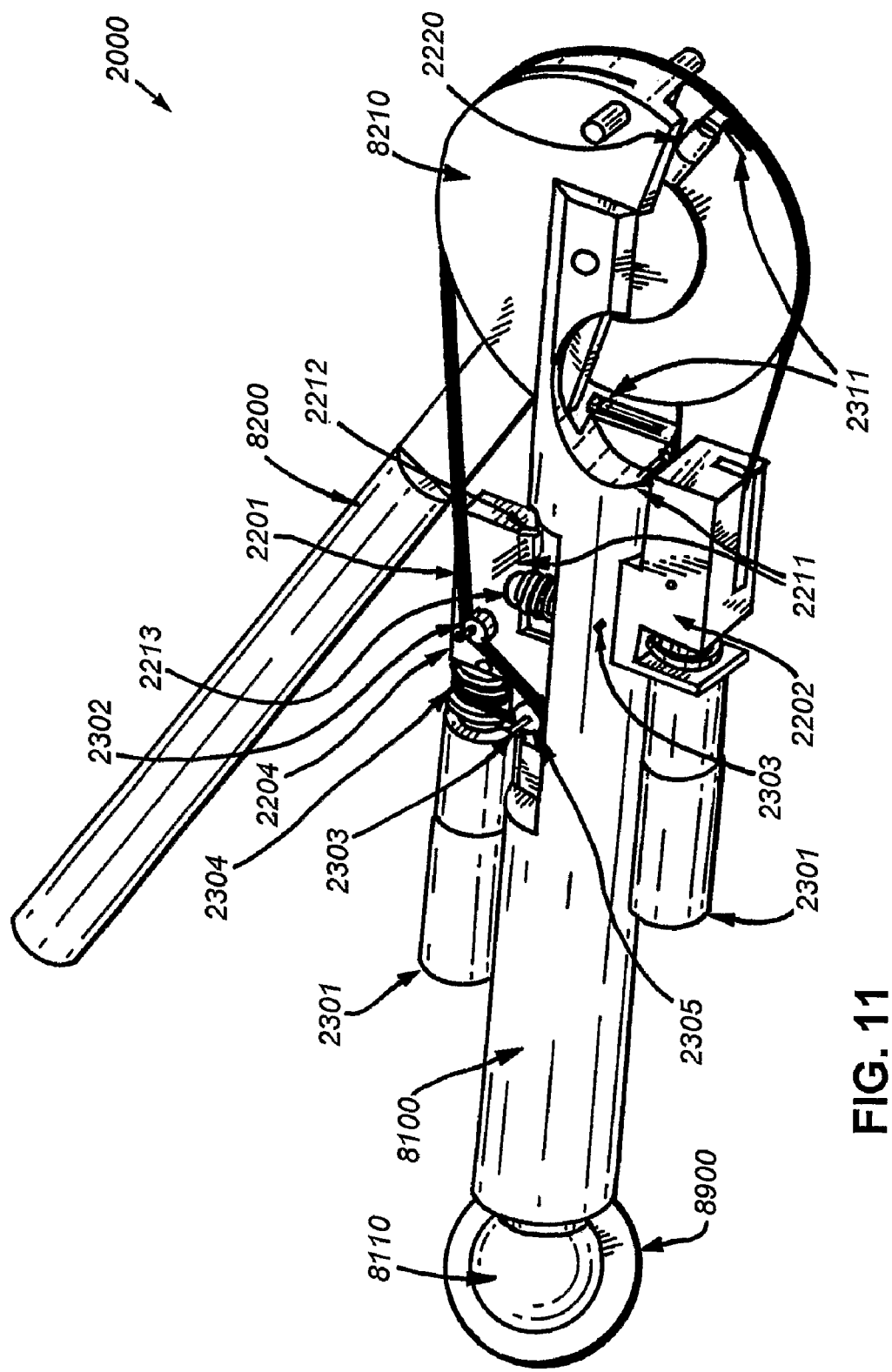
FIG. 11 is a perspective diagram of a three-dimensional view of the degree of freedom shown in FIG. 10 in accordance with an embodiment of the present invention.

FIG. 11 is a diagram of a three dimensional (3D) view of the kinematical diagram of FIG. 10. Shoulder 8100 is coupled to a body 8900 via a spherical joint 8110 that can be accomplished using kinematics similar to the spherical assembly 1000 shown in FIGS. 7A-7D.

Figure 12:
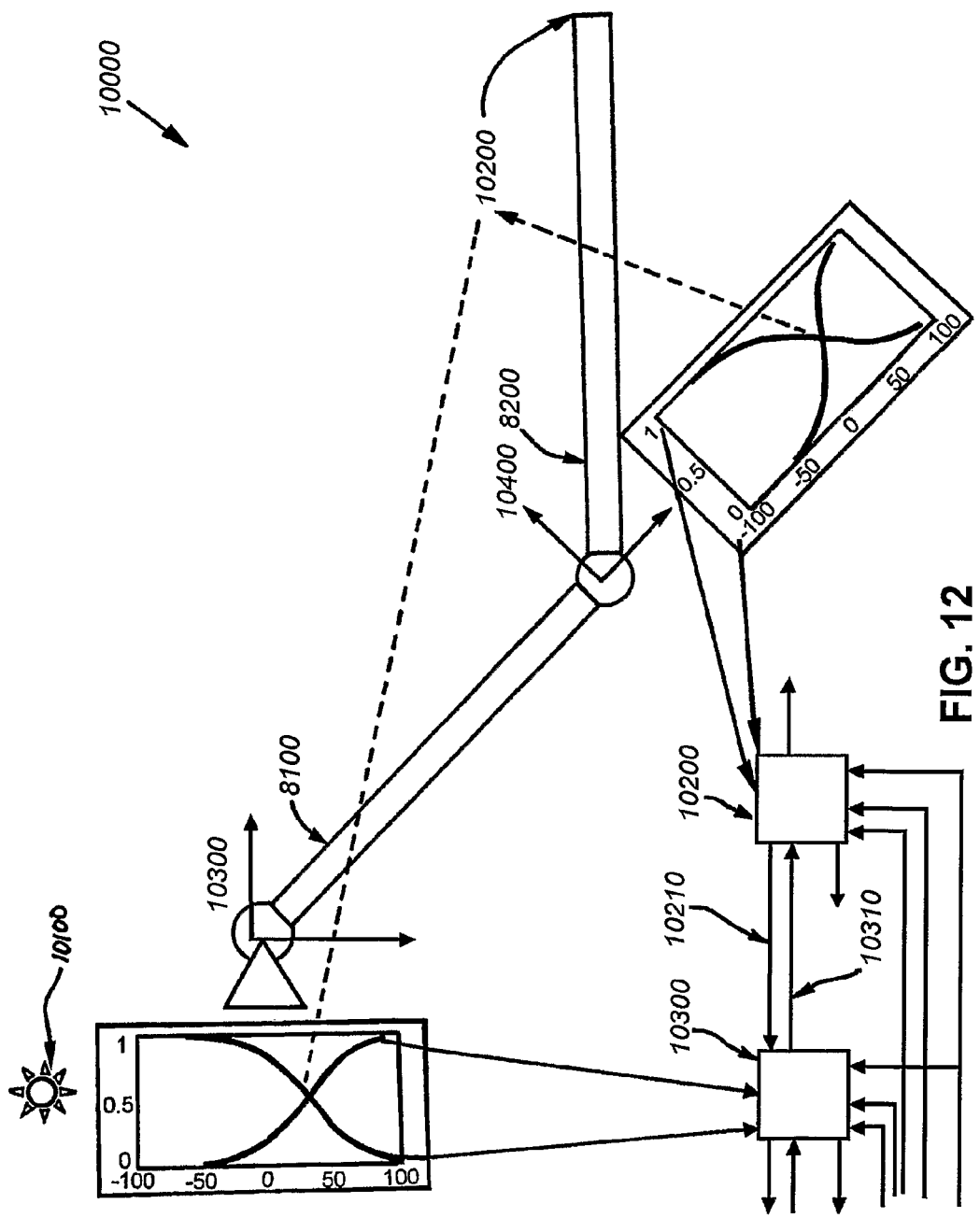
FIG. 12 is a perspective diagram and associated graphs illustrating spatial relationships between a common point of reference in a multi-appendage/sensor device in accordance with an embodiment of the present invention.

FIG. 12 is a schematic diagram illustrating spatial relationships between common point of reference 10100, such as a body coordinate system (BCS), for a multi-appendage and multi-sensor device. The positions of all joints and sensors can be uniquely defined in reference to BCS 10100. A shoulder coordinate system 10300 is referenced in the body coordinate system 10100, while elbow coordinate system 10400 is referenced in shoulder coordinate system 10300. A hand zero attractor 10200 is a superposition of the forearm zero attractor, shoulder zero attractor and shoulder coordinate system zero attractor. The energy state 10210 of the elbow NMC 10200 defined as the product of torque developed in elbow joint 10400 and displacement of forearm 8200 from its zero attractor point is communicated to the shoulder neuromorphic motion controller 10300 and shifts its attractor from zero point to a new location to minimize the energy state of 10200 resulting in increase of energy state 10310 of the shoulder neuromorphic motion controller 10300, which is communicated back to the elbow neuromorphic controller 10200. Such reciprocal relationships between adjacent neuromorphic motion controllers lead to minimizing of total energy of both joints 10300 and 10400 while positioning the hand in the hand offset attractor point away from the hand's zero attractor point 10200.

Figure 13A:
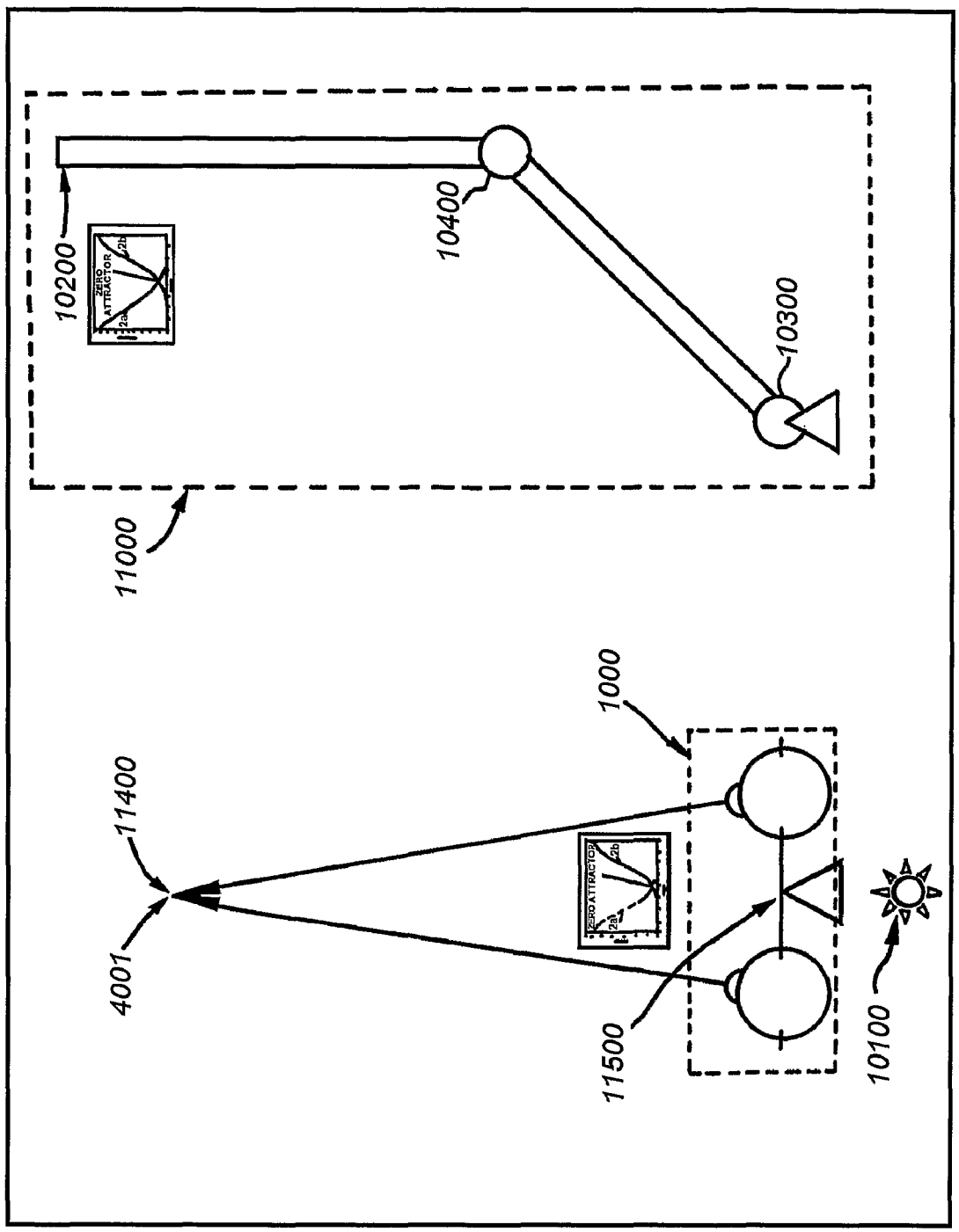
FIG. 13A is a perspective diagram illustrating an initial condition of a coordinated actions in an eye-hand system converging at a point of visual attention in accordance with an embodiment of the present invention.
Figure 13C:
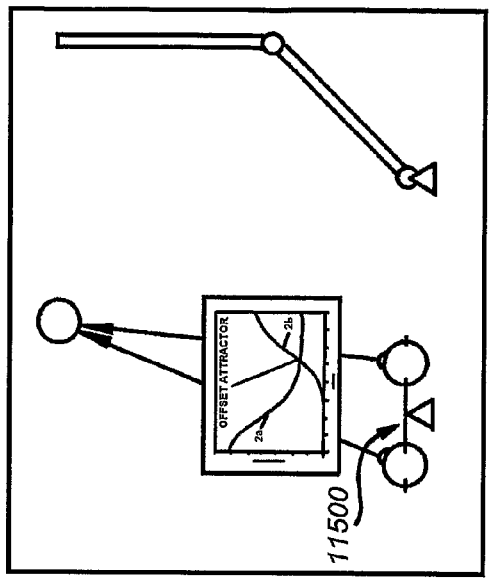
FIG. 13C is a perspective diagram and associated graphs illustrating a first phase of coordinated actions in an eye-hand system when cameras are converging at a point of visual attention in accordance with an embodiment of the present invention.
Figure 13B:
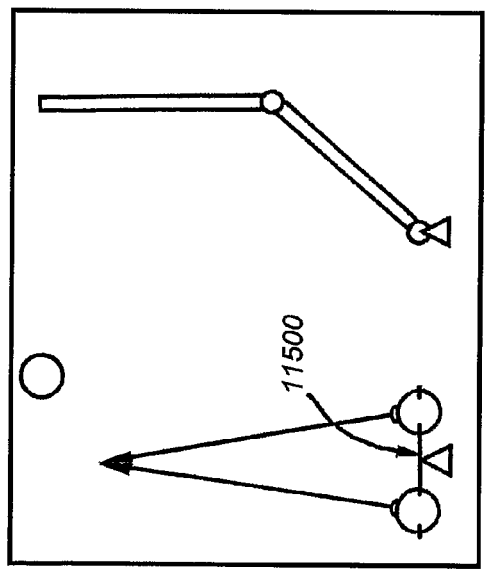
FIG. 13B is a perspective diagram illustrating an initial event triggering sequence of coordinated actions in an eye-hand system converging at a point of visual attention in accordance with an embodiment of the present invention.
Figure 13D:
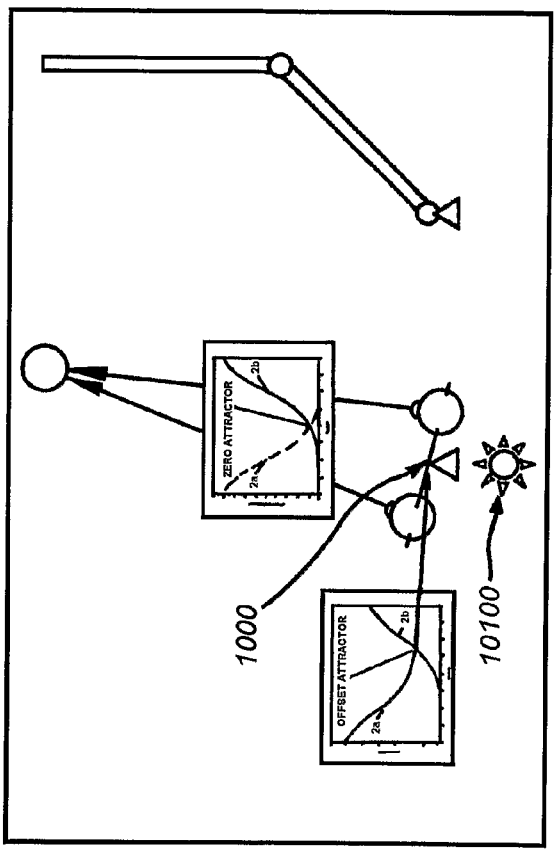
FIG. 13D is a perspective diagram and associated graphs illustrating coordinated actions in an eye-hand system when a "head" is rotated to minimize cameras' gaze disparity converging at a point of visual attention in accordance with an embodiment of the present invention.
Figure 13F:
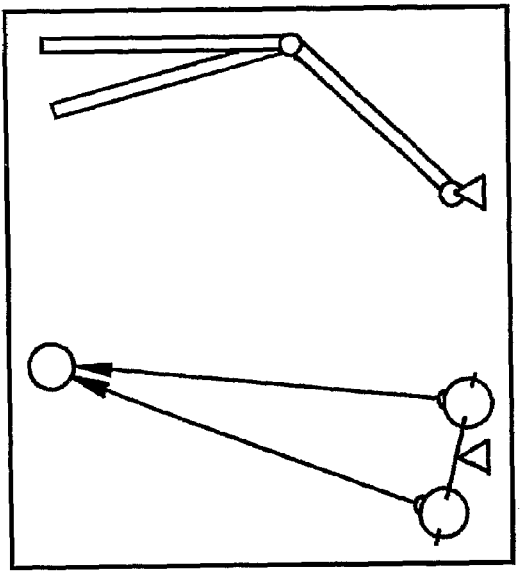
FIG. 13F is a perspective diagram illustrating coordinated actions in an eye-hand system converging at a point of visual attention when an arm is in a first phase of its motion to minimize total energy of the head-arm system in accordance with an embodiment of the present invention.
Figure 13H:
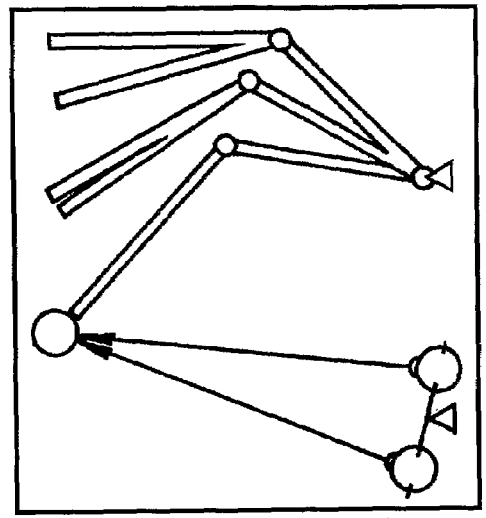
FIG. 13H is a perspective diagram illustrating coordinated actions in an eye-hand system converging at a point of visual attention when an arm is in the last phase of its motion, i.e. reaching an object that originally triggered the sequence of motions with an objective to minimize total energy of the head-arm system in accordance with an embodiment of the present invention.
Figure 13E:
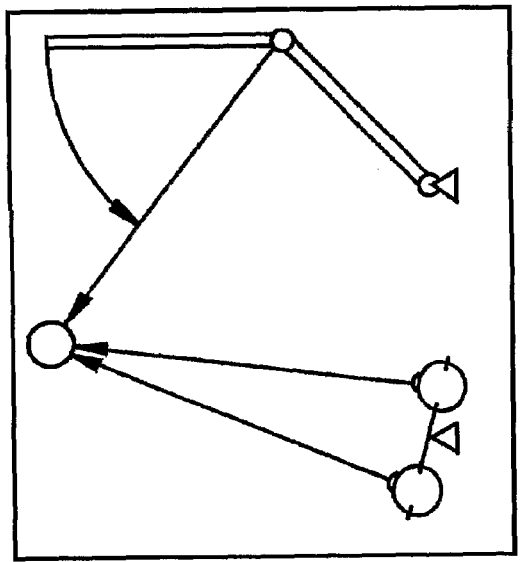
FIG. 13E is a perspective diagram illustrating coordinated actions in an eye-hand system converging at a point of visual attention when an increased energy state of the head attractor initiates an arm's motion to minimize total energy of the head-arm system in accordance with an embodiment of the present invention.
Figure 13G:
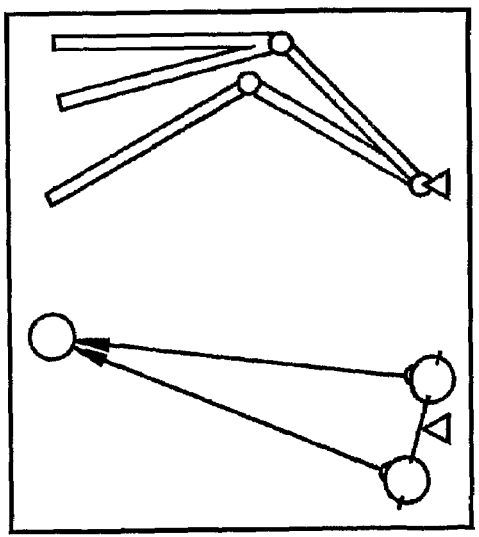
FIG. 13G is a perspective diagram illustrating coordinated actions in an eye-hand system converging at a point of visual attention when an arm is in the second phase of its motion to minimize total energy of the head-arm system in accordance with an embodiment of the present invention.

FIGS. 13A-C illustrate coordinated actions of an eye-hand system in converging at a point of visual attention. FIG. 13A illustrates a hand zero attractor 10200, eye zero attractor 4001 and head zero attractor 11400 defined within body coordinate system 10100. The hand zero attractor 10200 is a superposition of elbow and shoulder zero attractors. At an initial condition, the head zero attractor 11400 and eye zero attractor 4001 spatially coincide producing minimum possible energy in head coordinate system 11500. In FIG. 13B, an object appears in the field of view of the camera system 1000, which triggers an attentive response by converging two "eyes" on it (FIG. 13C), which, in turn, increases the energy state of camera system 1000 within head coordinate system 11500. Increased energy is communicated to the NMC that attempts to reduce the camera systems' energy by turning the "head" toward an object of interest (FIG. 13D). Two scenarios are possible at this point assuming that the system's objective is to park the hand at the object's location: (1) is to reposition the body to minimize the energy of the head 1000 in the body's coordinate system; (2) is to proceed with positioning the hand at the object's location while ignoring high energy of the head system. In the first scenario the increased head energy in the BCS is compensated by performing a rotational transformation of the body in the WCS to minimize the head's energy; furthermore, if an object is still outside of the reach of a hand, the body may perform a translational motion across the terrain brining the object of interest within the grasp of a hand. Considering the second option:

FIG. 13E illustrates how an offset attractor is assigned to the hand that brings the forearm into motion (FIG. 13F). As the forearm moves away from its resting position characterized by minimum energy, the forearm NMC communicates higher energy to the shoulder controller that brings the shoulder in motion (FIG. 13G). The motion progresses until the hand is parked in the location of object of interest and head-offset and hand-offset attractors coincide (FIG. 13H.)

D. Cooperative Limb Behavior

Another aim of the present invention is to provide a method for controlling cooperative behavior of multiple arms and/or legs that may be attached to a common spine in selecting the most efficient strategy in achieving the goal. For example, assume the goal of a two-arm robot is to park an end-effector (wrist) at the location O of the object of interest. A robot has three degrees of freedom per its left ("L") and right ("R") arm. Each arm illustratively comprises of left and right shoulders (hereinafter "SL" and "SR", respectively), left and right forearms ("FL" and "FR") and left and right wrists ("WL" and "WR"). The operational space of the two-arm robot is divided into three areas: "LEFT"—to the left from the rest parking position of "L", "CENTRAL"—between the rest parking positions of "L" and "R", and "RIGHT"—to the right of the rest parking position of "R". To break "L-R" arm parity, a robot has an arbitrary left-hand or right-hand dominance, defined as a default arm activity in case if a preferred action cannot be derived from the energy state only. Each wrist and shoulder has its own circular service area: LSA (Left Shoulder Service Area), LWA (Left Wrist Service Area), RSA (Right Shoulder Service Area), and RWA (Right Wrist Service Area). LSA and LWA define the left arm service area "LA", while RSA and RWA define the right arm service area or "RA". RA and LA overlap at RLA (Left Right Area). In accordance with the illustrative embodiment of the present invention, an object located to the left from the median and within RLA can be accessed either by L or R and it may appear that because of the closer proximity to L it will be selected for the job, however it can be shown that this is not always the case. In accordance with an embodiment of the present invention, a NMC achieves the goal of reaching O located in closer proximity to L using R. In another example, an object is located to the left from the parking attractor of the L; in this case it can be accessed either by L or R, however to access O using L a significant rotation of the torso is required, which is less energy-efficient then using R to reach O to the left from L with just slight or no torso rotation.

Figure 14:
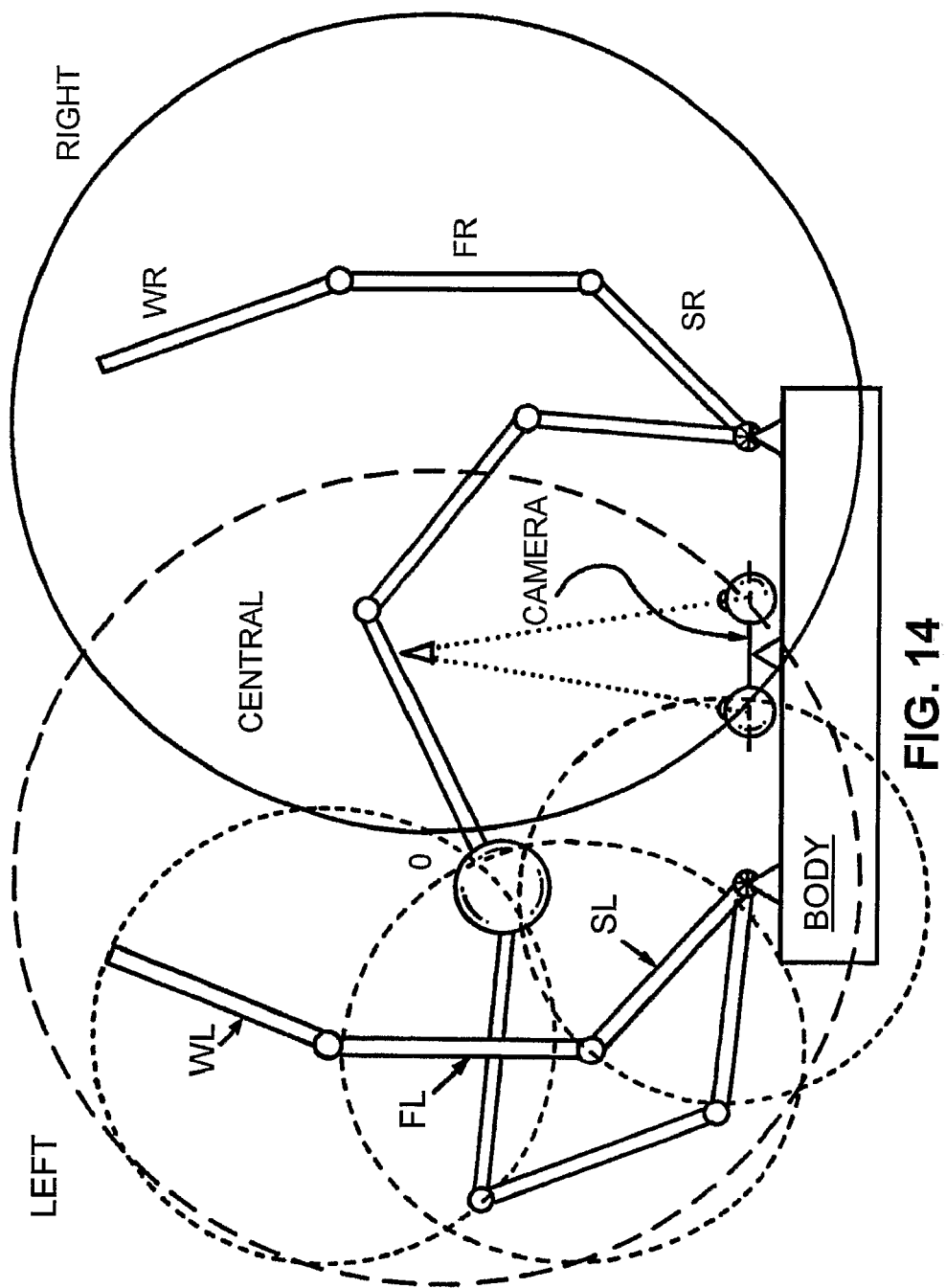
FIG. 14 is a perspective diagram of an operational space of a head-two-arms system in accordance with an embodiment of the present invention.

FIG. 14 is a schematic diagram illustrating how a two-arm robot resolves the ambiguity of selecting the arm to reach an object. The selection process is based on energy-state negotiation. The objective of a two-arm robot having Left and Right arms consisting of left and right shoulders SL, SR, left and right forearms FL, FR, and left and right wrists WL, WR is to park a wrist at the location of an Object "O". The operational space of the two-arm robot is subdivided into three areas, namely "LEFT" to the left from the rest parking position of "L", "CENTRAL" between the rest parking positions of "L" and "R", and "RIGHT" to the right of the rest parking position of "R".

At any given moment in time the energy state of the first arm is communicated to the joint controllers of the second arm is such a way that the lower energy arm suppresses the motion of an arm that currently has higher energy resulting in preferential motion of an arm that requires lower overall energy to reach the desired point in operational space. In the rare case when both arms have absolutely equal energy states, a "L-R" arm parity is "broken" by an arbitrary left or right dominance, defined as default arm activity in case there is no obvious preferential energy-only-defined action can be selected.

Wrists, forearms and shoulders have their own circular service area: ASL, AWL, ASR, and AWR. ASL and AWL define the left arm service area "AL", while ASR and AWR define the right arm service area or "AR". AR and AL illustratively overlap at ARL.

Many other permutations of the described mechanisms and various combinations of such mechanisms will become apparent to those skilled in the art without limiting the scope of the present invention. For example, a humanoid robot may consist of two eye modules mounted on a head module which is, in turn, mounted on a torso via several rotational neck joints (vertebrae), having two arms also attached to a torso, whereby a torso can rotate around its vertical axis and perform translational motions across the terrain. All elements of a robot as described herein except torso have parking (rest) attractor. The torso/legs system does not have an attractor as it can freely move over the terrain, however, in a more complicated legged arrangement, each leg may also have multiple degrees of freedom and therefore attractors. For example, if the goal is to reach an object located outside of the service areas of both arms, the motion scenario may unfold as follows: eyes lock on an object, which causes parking two eyeballs away from their rest attractors, increased energy from the eye subsystem causes the head to turn around vertebrae, the rotation progresses from the apical (atlas) vertebra down the spine. Concurrently with head rotation, arms begin their movement toward an object of interest. If a wrist of an arm (end-effector) can successfully park at the location "O", the robot completes it motion by minimizing the total energy of all appendages, which is achieved by rotating torso, shoulders, head and eyes and bringing the entire system to a lowest energy level. If an end-effector can not be parked at the location "O", the torso will continue rotating until at least eyes, head, shoulders and torso orientations are such that a minimal energy state is achieved at which point a spatial relationship between "O" and the closest end-effector is estimated to calculate the translational motion of the robot to a new spatial location across the terrain to a new point in the World Coordinate System from which O can be reached by the robot's arms. The present invention has, thus, been shown and described with respect to illustrative embodiment thereof which should only be taken by way of example. It should be noted that various other changes, omissions and/or additions in the form and detail thereof may be made therein without departing from the spirit and scope of the present invention.

What is claimed is:

1. A neuromorphic motion controller comprising:
   (a) a movable joint having at least one degree of rotational or transitional freedom and an inducer operatively interconnected with the joint;
   (b) a flexor channel comprising of a first actuator operatively connected via a flexor tendon to the joint;
   (c) a flexor stretch sensor operatively connected with the flexor tendon;
   (d) an extensor channel comprising of a second actuator operatively connected via extensor tendon to the joint;
   (e) an extensor stretch sensor operatively connected to the extensor tendon;
   (f) a flexor channel positional transducer coupled to the inducer, wherein the flexor channel positional transducer is adapted to produce a flexor positional response characteristic;
   (g) an extensor channel positional transducer coupled to the inducer, wherein the extensor channel positional transducer is adapted to produce an extensor positional response characteristic;
   (h) module adapted to calculate a difference of products of outputs of the first and second stretch and positional sensors of the extensor channel and the flexor channel by:

$$E = \omega_f * \theta_f * T_f - \omega_e * \theta_e * T_e;$$

wherein E comprises a energy characteristics of the joint;
   wherein Wf comprises a flexor weight multiplier coefficient and We comprises an extensor weight multiplier coefficient;
   wherein Of comprises an output of a flexor positional sensor and $0e$ comprises an output of a extensor positional sensor; and
   wherein Tf comprises an output of the first stretch sensor and Te comprises an output of the second stretch sensor, wherein the first and second actuators operate antagonistically to each other;
   wherein the flexor response characteristic and the extensor response characteristic are combined to produce a neuromorphic motion controller response characteristic that produces a winner take all operation on flexor-extensor response; and
   wherein the neuromorphic motion controller is at a zero attractor point at a point of intersection of the extensor positional response characteristic and the flexor positional response characteristic on the combined response characteristic.

2. The neuromorphic motion controller of claim 1 wherein the first and second stretch sensors comprise, spring loaded transducers.

3. The neuromorphic motion controller of claim 1 wherein the first and second stretch sensors comprise spring-loaded Hall-effect transducers.

4. The neuromorphic motion controller of claim 1 wherein the flexor channel transducer and the extensor channel transducer are arranged so that when the inducer generates a maximum response in the flexor channel transducer, a minimum response is generated in the extensor channel transducer.

5. The neuromorphic motion controller of claim 4 wherein the extensor positional response characteristic and the flexor positional response characteristic are sigmoid shaped.

6. The neuromorphic motion controller of claim 1 wherein the flexor channel transducer and the extensor channel transducer are arranged so that when the inducer generates a maximum response in the extensor channel transducer, a minimum response is generated for the flexor channel transducer.

7. The neuromorphic motion controller of claim 1 wherein a soft lock point is associated with the joint by generating a dip in at least one of the extensor response characteristic and the flexor response characteristic.

8. The neuromorphic motion controller of claim 1 wherein one of the extensor response characteristic and the flexor response characteristic is biased from an original state to thereby form an offset attractor.

9. The neuromorphic motion controller of claim 8 wherein the offset attractor causes the joint to drift to a location defined by the offset attractor.

10. The neuromorphic motion controller of claim 8 wherein a flexor stretch sensor output and a extensor stretch sensor output are fed back into inputs of flexor and extensor channels correspondingly providing means for optimal force-feedback loop.

11. The neuromorphic motion controller of claim 10 further comprising a first energy input to accept an energy characteristics $E_{i-1}$ of a first attached neuromorphic motion controller and a second energy input to accept an energy characteristics $E_{i-1}$ of a second attached neuromorphic motion controller.

12. The neuromorphic motion controller of claim 11 further comprising:
    means for receiving a first input energy state $E_{i-1}$ from a first neuromorphic motion controller and a second input energy stat $E_{i+1}$ from a second neuromorphic motion controller to adjust the position of an offset attractor in order to minimize one or both inputs $E_{i-1}$ and $E_{i+1}$; and
    means for receiving a parameter defining a desired behavioral pattern.

13. The neuromorphic motion controller of claim 12, when a neuromorphic motion controller is adapted to receive an input energy state from another neuromorphic motion controller.

14. The neuromorphic motion controller of claim 1 further comprising a module adapted to receive a first input energy state from a first neuromorphic motion controller and a second input energy state from a second neuromorphic motion controller, the module further adapted to receive a parameter defining a desired behavioral pattern.

15. A neuromorphic motion controller comprising:
    a joint operatively connected to a flexor channel and an extensor channel;
    an inducer operatively interconnected with the joint, the inducer coupled to means for producing a flexor response characteristic and means for producing an extensor response characteristic;
    means for combining the flexor response characteristic and the extensor response characteristic to form a combined response characteristic; and
    wherein the point of equilibrium exists for the joint at a point of intersection of the extensor response characteristic and the flexor response characteristic on the combined response characteristic.

16. The neuromorphic motion controller of claim 15 wherein one of the extensor response characteristic and the flexor response characteristic is biased from an original state to thereby form an offset attractor.

17. The neuromorphic motion controller of claim 16 wherein the offset attractor causes the joint to drift to a location defined by the offset attractor.

18. The neuromorphic motion controller of claim 15 further comprising means for biasing one of the extensor response characteristic and the flexor response characteristic from an original state to thereby form an offset attractor.

19. The neuromorphic motion controller of claim 15 further comprising:
    means for receiving a first input energy state from a first neuromorphic motion controller and a second input energy state from a second neuromorphic motion controller; and
    means for receiving a parameter defining a desired behavioral pattern.

20. The neuromorphic motion controller of claim 15 wherein the flexor channel transducer and the extensor channel transducer are arranged so that when the inducer generates a maximum response characteristic for the flexor channel transducer, a minimum response characteristic is generated for the extensor channel transducer.

21. The neuromorphic motion controller of claim 15 wherein the flexor channel transducer and the extensor channel transducer are arranged so that when the inducer generates a maximum response characteristic for the extensor channel transducer, a minimum response characteristic is generated for the flexor channel transducer.

22. A method for neuromorphically controlling motion of a joint comprising the steps of:
    sensing a flexor response characteristic of a flexor interconnected with the joint;
    sensing a response characteristic of a tendon interconnected with the joint;
    combing the flexor response characteristic and the flexor response and thereby driving a combined response characteristic; and
    establishing an equilibrium point at a point of intersection of the flexor response characteristic and the flexor response characteristic on the desired response characteristic.

23. A system for controlling a joint comprising:
    a combiner that receives and combines a flexor response characteristic associated with the joint and a exterior response characteristic associated with the joint and a an extensor response characteristic associated with the joint into a combined response characteristic; and
    wherein the joint is in equilibrium at a point in which the flexor response characteristic and the exterior response characteristic intersect the combined characteristic.

* * * * *